United States Patent
Kiukkonen et al.

(10) Patent No.: US 8,200,157 B2
(45) Date of Patent: Jun. 12, 2012

(54) ALLOWED SPECTRUM INFORMATION DISTRIBUTION SYSTEM

(75) Inventors: Niko Kiukkonen, Veikkola (FI); Mikko Uusitalo, Helsinki (FI)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 12/833,118

(22) Filed: Jul. 9, 2010

(65) Prior Publication Data
US 2012/0009874 A1    Jan. 12, 2012

(51) Int. Cl.
H04B 7/00 (2006.01)
(52) U.S. Cl. ........... 455/41.2; 455/450; 455/452.2; 455/509; 455/454; 455/63.1; 455/114.2; 455/448; 370/338; 370/341; 370/395.4; 370/395.42; 370/348
(58) Field of Classification Search .......... 455/41.2, 455/450, 452.2, 454, 448, 509, 63.1, 114.2, 455/67.13
See application file for complete search history.

(56) References Cited

U.S. PATENT DOCUMENTS

| | | | | |
|---|---|---|---|---|
| 6,768,721 | B1 * | 7/2004 | Schmitz et al. | 370/248 |
| 6,944,457 | B2 | 9/2005 | Alinikula et al. | |
| 7,408,907 | B2 * | 8/2008 | Diener | 370/338 |
| 7,424,268 | B2 * | 9/2008 | Diener et al. | 455/62 |
| 7,653,397 | B2 * | 1/2010 | Pernu et al. | 455/450 |
| 7,778,603 | B2 * | 8/2010 | Palin et al. | 455/41.2 |
| 7,826,459 | B2 * | 11/2010 | Xhafa et al. | 370/395.5 |
| 7,969,958 | B2 * | 6/2011 | Yuasa | 370/348 |
| 2003/0125019 | A1 * | 7/2003 | Bajikar | 455/420 |
| 2006/0205401 | A1 * | 9/2006 | Palin et al. | 455/425 |
| 2006/0292986 | A1 * | 12/2006 | Bitran et al. | 455/41.2 |
| 2007/0253394 | A1 | 11/2007 | Horiguchi et al. | |
| 2009/0088089 | A1 | 4/2009 | Chandra et al. | |
| 2009/0161617 | A1 * | 6/2009 | Abedi | 370/329 |
| 2009/0180359 | A1 | 7/2009 | Walter | |
| 2009/0298522 | A1 | 12/2009 | Chaudri et al. | |
| 2011/0143761 | A1 | 6/2011 | Uusitalo et al. | |

FOREIGN PATENT DOCUMENTS

| | | |
|---|---|---|
| EP | 1168716 | 1/2002 |
| WO | WO2008062249 | 5/2008 |
| WO | WO2010111150 | 9/2010 |
| WO | WO 2011023206 | 3/2011 |

OTHER PUBLICATIONS

Extended European Search Report for EP Application No. 11168654.9 dated Sep. 29, 2011.

* cited by examiner

*Primary Examiner* — Marceau Milord
(74) *Attorney, Agent, or Firm* — Locke Lord, LLP

(57) ABSTRACT

A system for determining allowed channels for operating in unlicensed bandwidth. Initially, an apparatus may determine whether valid allowed channel information corresponding to the current position of the apparatus already exists in the apparatus. If the allowed channel information corresponding to the current position of the apparatus does not exist in the apparatus or is invalid, the apparatus may then determine if the allowed channel information can be provided by another apparatus. If the allowed channel information is available from another apparatus, this information may be requested from the other apparatus. Otherwise, the allowed channel information may be requested from a database.

29 Claims, 17 Drawing Sheets

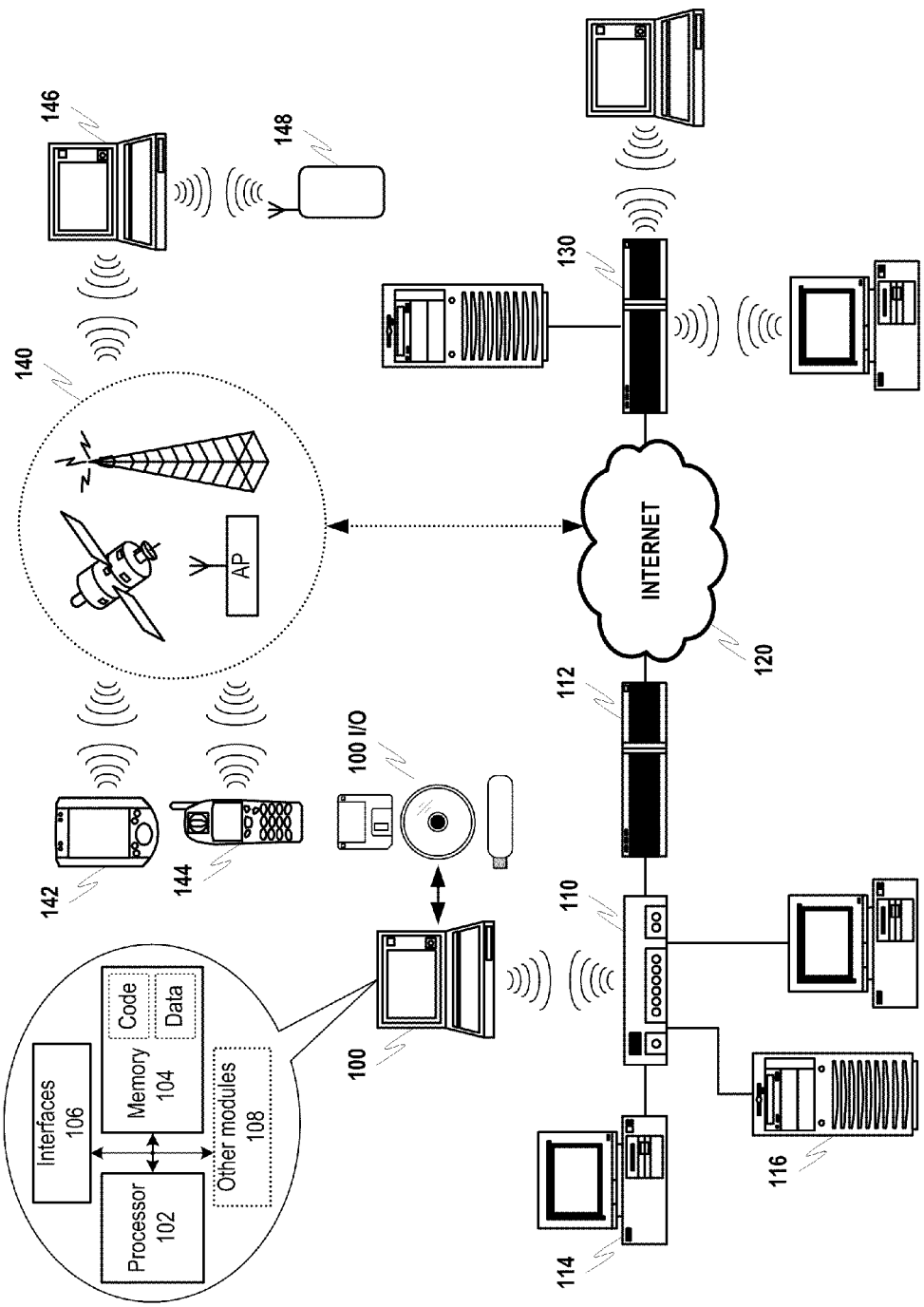

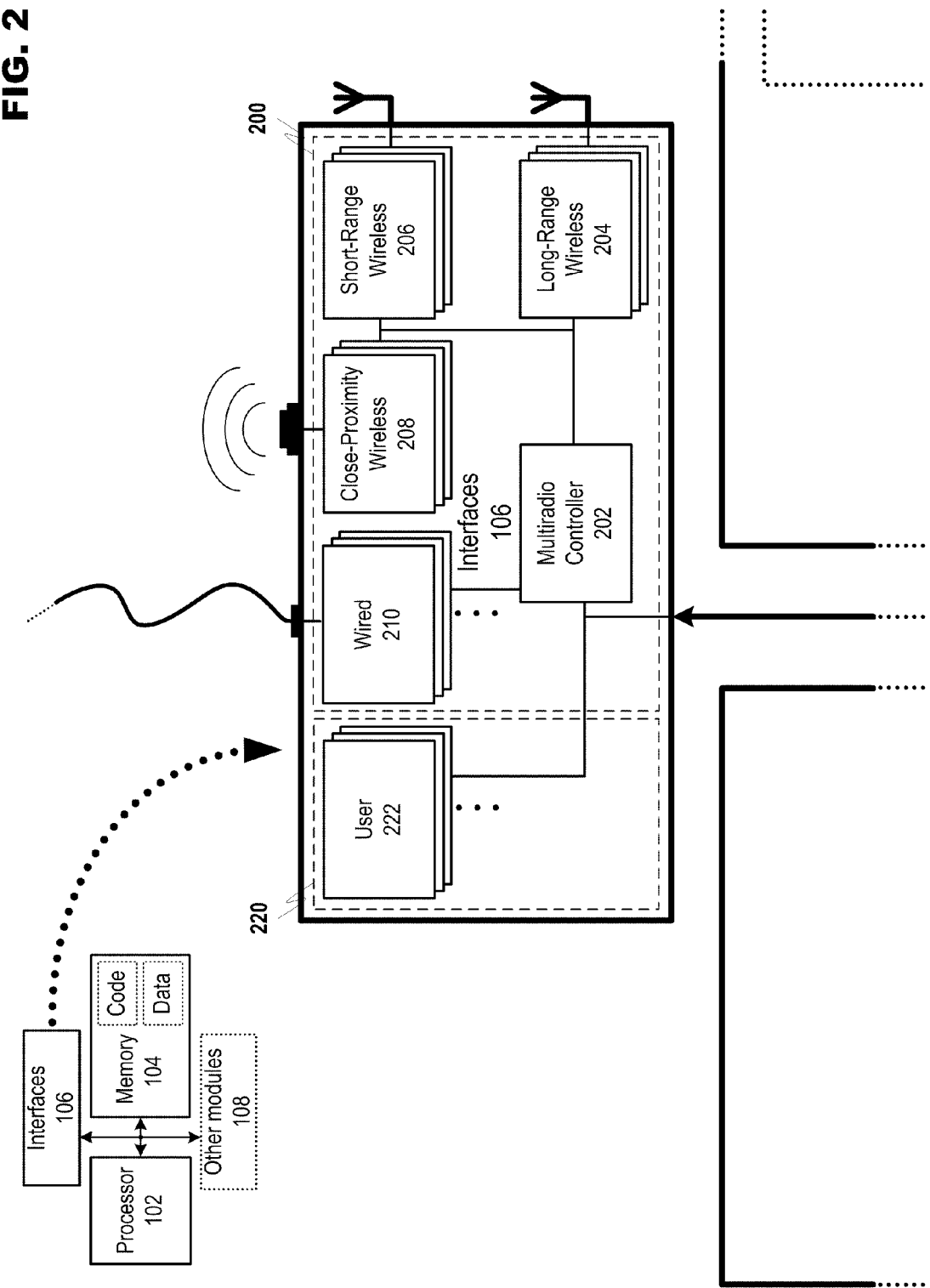

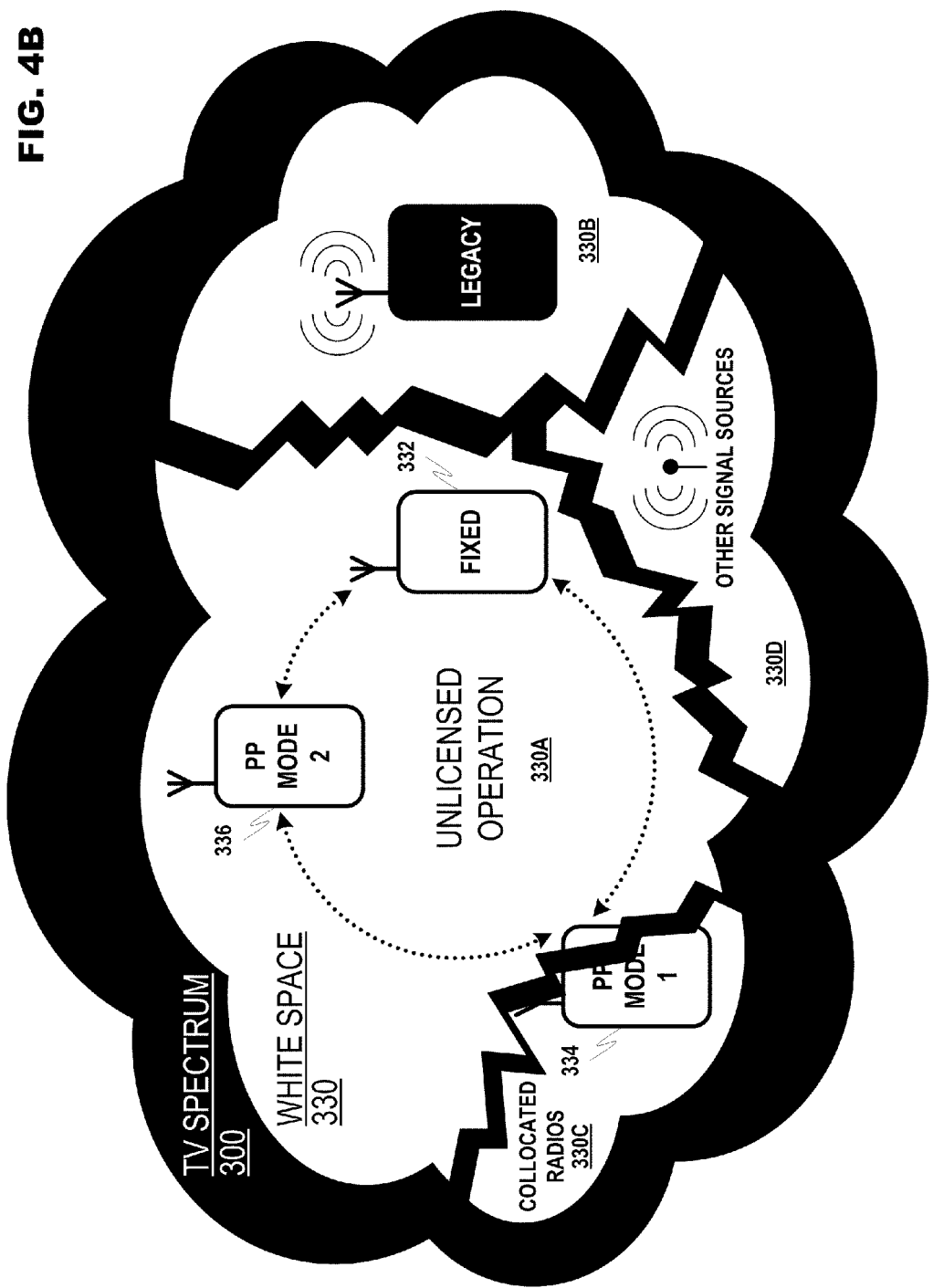

ALLOWED SPECTRUM INFORMATION DISTRIBUTION SYSTEM

BACKGROUND

1. Field of Invention

The present invention relates to apparatus coexistence, and in particular, to the provision of allowed channel information from sources in addition to a centralized database.

2. Background

Wireless communication technology continues to proliferate. As more and more apparatuses enter the marketplace, additional bandwidth must be made available to support their operation. Support for the expansion of operation within exclusive bandwidth (e.g., frequencies reserved for cellular communication) may just be a matter of communications providers buying the rights to additional reserved bandwidth. However as the total amount of available bandwidth is finite, it is getting increasingly difficult to reserve bandwidth to support emerging apparatuses. Unlicensed bandwidth provides a possible solution, but the provision of additional bandwidth in public use frequencies has been more problematic due in part to the growing number of devices operating in this area (e.g., peripheral devices such as headsets, keyboards, external storage, etc). In addition to the frequencies that are already available for unlicensed short-range wireless operation, U.S. regulators are now engaged in the reallocation of certain frequencies that were previously reserved for television (TV) broadcasts. While such reallocation may provide needed bandwidth for supporting short-range wireless communication in devices such as mobile handsets, the operation of new and legacy devices in the same space is not without its obstacles.

For example, the fact that certain frequencies in available spectrum are currently unused and may be reallocated for unlicensed short-range wireless communication does not eliminate all of the legacy operators (e.g., AM/FM radio, TV, etc.) that may still be active in the same, or nearby, frequencies. In this regard, the U.S. Federal Communications Commission (FCC) has decided that while TV white space (including frequencies that were previously reserved for TV channels but are not being currently used) may be reallocated for unlicensed broadband use, the apparatuses communicating in the unlicensed spectrum must still respect (avoid interfering with) any legacy operations. Active sensing is required as the frequencies used by legacy systems may vary geographically, resulting in different ranges of the spectrum being available in different areas. So, in addition to avoiding potential interference that may be caused by the many apparatuses interacting in the unlicensed bandwidth, the same apparatuses must also operate in accordance with the rules prohibiting interference with legacy apparatuses.

SUMMARY

Various example embodiments of the present invention may be directed to a method, computer program product, apparatus and system for determining allowed channels for operating in unlicensed bandwidth. Initially, an apparatus may determine whether valid allowed channel information corresponding to the current position of the apparatus already exists in the apparatus. If the allowed channel information corresponding to the current position of the apparatus does not exist in the apparatus or is invalid, the apparatus may then determine if the allowed channel information can be provided by another apparatus. If the allowed channel information is available from another apparatus, this information may be requested from the other apparatus. Otherwise, the allowed channel information may be requested from a database.

Allowed channel information is valid in certain geographic locations. It may also be valid only for a certain amount of time based on time validity information. An apparatus may determine the validity of allowed channel information based on geographic location information and time validity information in the allowed channel information. It may be more expeditious for apparatuses to obtain allowed channel information from other apparatuses rather than going to a central database for this information. Apparatuses may inquire with other apparatuses in the area to determine whether they have valid allowed channel information. This interaction may occur by short-range wireless communication or another communication medium. If valid allowed channel information is located in another apparatus, the apparatus may initiate a cognitive radio connection to the other apparatus to get the valid allowed channel information. If allowed channel information is not available from another apparatus, then the apparatus may access the database via an access point and transmit a request for allowed channel information including geographic area information corresponding to the current position of the apparatus.

If a request for allowed channel information is received by the database, a determination may be made as to whether the allowed channel request includes apparatus type information. For example, an apparatus that needs to transmit a request for allowed channel information may first make a determination as to whether the apparatus is moving. If the apparatus is moving, the request for allowed channel information may indicate that the apparatus that sent the request is a "mobile" type apparatus. Otherwise, the request for allowed channel information may omit any indication of apparatus type information, or alternatively, may indicate that the apparatus that sent the request for allowed channel information is a "fixed" type apparatus.

The database, upon receiving a request for allowed channel information that is determined to comprise apparatus type information, may process these requests differently than requests that are determined to not comprise apparatus type information. For example, requests that comprise apparatus type information may be prioritized based on whether the apparatus type is a "mobile" apparatus type or a "fixed" apparatus type. In accordance with at least one embodiment of the present invention, requests that originated from "mobile" type apparatuses may be given a higher priority for processing over requests that originated from "fixed" type apparatuses. These requests may then be processed by the database in order to create at least a response to the request. The responses may then be transmitted, wherein the responses comprise at least allowed channel information.

In addition to receiving requests for allowed channel information at a database, it is also possible that requests for allowed channel information may be received at apparatuses. In accordance with at least one embodiment of the present invention some apparatuses may receive requests for allowed channel information pertaining to a certain location from other apparatuses. Apparatuses that receive these requests may first determine whether they contain valid allowed channel information corresponding to the certain location. If valid allowed channel information for the certain area is available, the apparatuses may further process this information in order to create a subset of the valid allowed channel information for inclusion in responses transmitted to requesting apparatuses. The subset may contain valid allowed channel information provided in various formats. For example, the subset may comprise allowed channels that are not being utilized by other apparatuses operating in the certain location or may comprise allowed channels listed in a preferred order of use based on allowed channels that were used by the apparatus.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1 discloses example apparatuses, communication configuration and network architecture usable in implementing at least one embodiment of the present invention.

FIG. 2 discloses additional detail with respect to example communication interfaces that may be usable with various embodiments of the present invention.

FIG. 3 discloses an example of an operational environment in which at least one embodiment of the present invention may be implemented.

FIG. 4B discloses examples of other potential signal sources that may exist in the example operational environment that was initially disclosed in FIG. 3.

DESCRIPTION OF EXAMPLE EMBODIMENTS

Figure 4A:
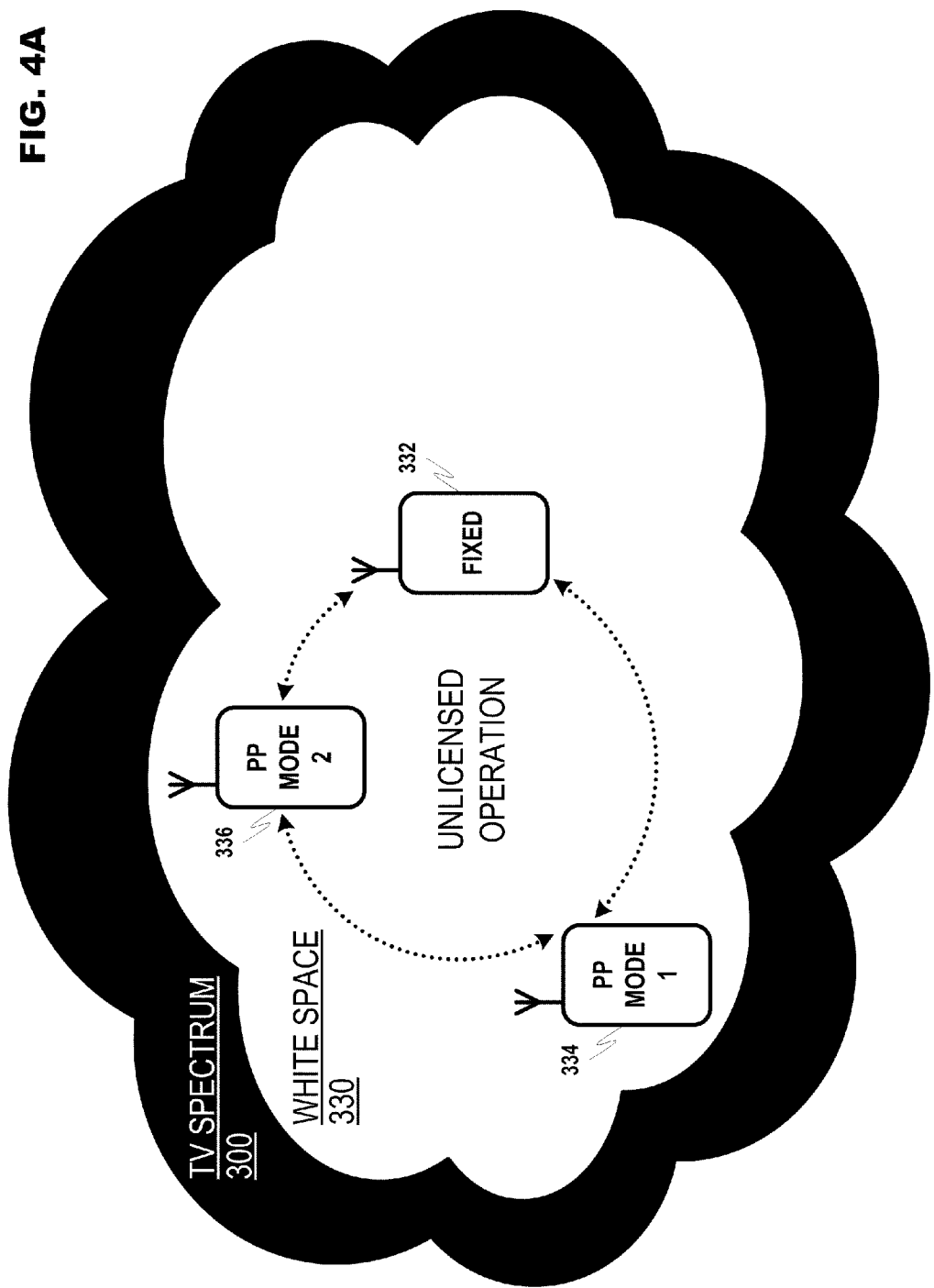
FIG. 4A discloses further detail regarding the example operational environment that was initially disclosed in FIG. 3.

While the invention has been described below in terms of a multitude of example embodiments, various changes can be made therein without departing from the spirit and scope of the invention, as described in the appended claims.

I. Example System with Which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

II. Example Operational Environment

FIG. 3 discloses an example environment that will be utilized for explaining the various embodiments of the present invention. While a TV white space system will be utilized for the sake of example herein, the various example implementations of the present invention that will be disclosed below are not strictly limited only to this operational environment. As a result, various embodiments of the present invention may be applied to different situations that may have somewhat similar characteristics. For instance, such scenarios may include one or more apparatuses interacting wirelessly in an operational environment that is also experiencing substantial signal activity due to other signal sources that are also present in the environment.

FIG. 3 discloses an example of a rudimentary white space system. Initially, bandwidth 300 may be licensed to broadcasters 310. Bandwidth 300 may be separated into channels that are used by broadcasters 310 to send programming to TV 320. For example, each channel may be used by a broadcaster 310 to transmit audio/visual programming to TV 320, by wireless microphones, etc. However, some of bandwidth 300 that is licensed for TV programming may remain unused (e.g., there is no broadcaster using the channel, other signal sources may create interference within the frequency range that defines a channel, etc.). This unused space is identified in FIG. 3 as white space 330. White space 330 may therefore comprise some licensed bandwidth within bandwidth 300 that may be reallocated. TV white space (TVWS) in the U.S. may comprise TV channels 21-51, 470 MHz to 698 MHz, excluding channel 37. As a result, any channel that is not being used within the range of channels 21 to 36 and/or channels 38 to 51 may be reallocated for other uses, such as for unlicensed short-range wireless communication (e.g., allowing close-proximity wireless networks to be formed between apparatuses). There may also be unused VHF and UHF channels in which white space operation is permitted, but these channels are currently for fixed-to-fixed apparatus communication only.

Now referring to FIG. 4A, the example of white space 330 as an environment in which apparatuses may interact is explored further. In TVWS network terminology there may be two categories of apparatus: fixed and personal/portable. Fixed apparatuses 334 are stationary, and thus, have a constant position over time. Personal/portable devices may be capable of moving, so their location may vary over time. Furthermore, personal/portable devices are categorized into PP Mode I apparatuses 334 and PP Mode II apparatuses 336. PP Mode II devices 336 can initiate networks (e.g., they can serve as access points in WLAN-type networks) as a master device. PP Mode I devices 334 can only operate as clients of TVWS networks, which may be controlled by either fixed apparatus 332 or PP Mode II device 336. Both fixed apparatuses 332 and personal/portable Mode II devices 336 may utilize spectrum sensing and database access to determine whether or not a channel is occupied by a primary user. In addition, a "special" type of apparatus (not pictured) may also be defined in TVWS networks. Such special apparatuses may be portable and may rely only on spectrum sensing to identify occupied channels.

Ideally, apparatuses 332, 334 and 336, as disclosed FIG. 4, may interact freely via wireless communication as long as they remain within the frequency range established for white space 330. However, in practice white space 330 may not be an ideal operational environment. This concept is discussed further with respect to FIG. 4B. In example scenarios where white space 330 is made available for unlicensed short-range wireless communication, many signal sources may exist within this frequency range, and as a result there may be many opportunities for interference to occur between these various sources. Initially, intra-apparatus interference (e.g., interference in an apparatus caused by other functionality occurring in the same apparatus) may exist. Co-located coexistence interference 330C means that devices may contain multiple radios that concurrently support wireless transports operating in proximate frequency bands, or that may otherwise still experience quality problems during simultaneous operation due to, for example, harmonic or inter-modulation interference. In this instance the multiple radios may cause interference between themselves. This is especially a problem if the apparatus is mobile cellular handset or other small factor device since the physical distance between the antennas is insubstantial (e.g., closer antennas=increased interference) and even the smallest leakage power can result in significant performance degradation. Transmission power level may also be a contributor to intra-apparatus interference, which may differ based on type of radio (e.g., cellular radio ~2 W is stronger than short-range unlicensed radio ~100 mW).

The Quality of Service (QoS) delivered by wireless transports may also depend on the sensitivity of the radio technology being employed (e.g., how resistant is the technology to interference). For example, severe co-located interference may occur when a high power radio transmits at the same time when low power radio is receiving. For example, if a device supports both Long Term Evolution (LTE) operating at 700 MHz and TVWS technology using wireless local area network (WLAN) technology where the TVWS channel exists at high end of TV band (e.g., ~690 MHz), the interference between LTE and TVWS technology can be substantial. The aforementioned case is just an example. Other combinations may also prove problematic. For example, other signal sources 330D may comprise apparatuses whose signals are present within the operational environment but are not part of the short-range unlicensed wireless network formed as disclosed at 330A. Other signal sources 330D may comprise, for example, electronic or electromechanical apparatuses whose operation causes electromagnetic field (EMF) interference in the operational environment. Moreover, wireless-enabled apparatuses that are operating close by but are not participating in unlicensed operation 330A may also contribute to signal traffic.

Such wireless-enabled apparatuses may prove extremely problematic in TVWS network systems since there may be very strict sensing requirements of incumbent users (e.g., legacy users 330B). For example, in TVWS systems a device may be requested to sense if a channel is used by a primary user before initiating any communication in that radio channel. Primary users may include, for example, TV broadcasters, wireless microphones or other protected devices. More specifically, the FCC is currently requiring that devices must operate using a −114 dBm detection sensitivity, which may be subject to change depending on various criteria such as updated wireless management regulations, changes in environment (traffic), etc. Sensitivity requirements may also be different depending on region (e.g., vary by country, etc.). As a result, any other co-located or close-by radio should interfere less than the above value to avoid false positive detections of primary users.

III. Example Allowed Channel Distribution

One manner in which operation within a TVWS system may be managed is by strictly assigning the frequencies in which apparatuses are allowed to operate. An example of the management of wireless communication in this manner is disclosed with respect to FIG. 5. According to White Space regulations that are being established by the FCC, apparatuses that are able to communicate in TVWS environments are initially required to ask permission to use white space frequencies. Asking permission may entail requesting a set of allowed channels from access points that are connected to database that administers these requests. The access points are required to update a set of available frequencies once per day from the database. This set of frequencies may pertain to the specific geographic area in which the access point is operating, and thus, in order to approve a request apparatuses need to report their location to the database so that the appropriate set of allowed channels may be provided back to the device. In the case of mobile apparatuses, the current location of the apparatus must be reported, and a new permission to use frequencies must be obtained, whenever apparatus location changes more than 50 meters.

Figure 5A:
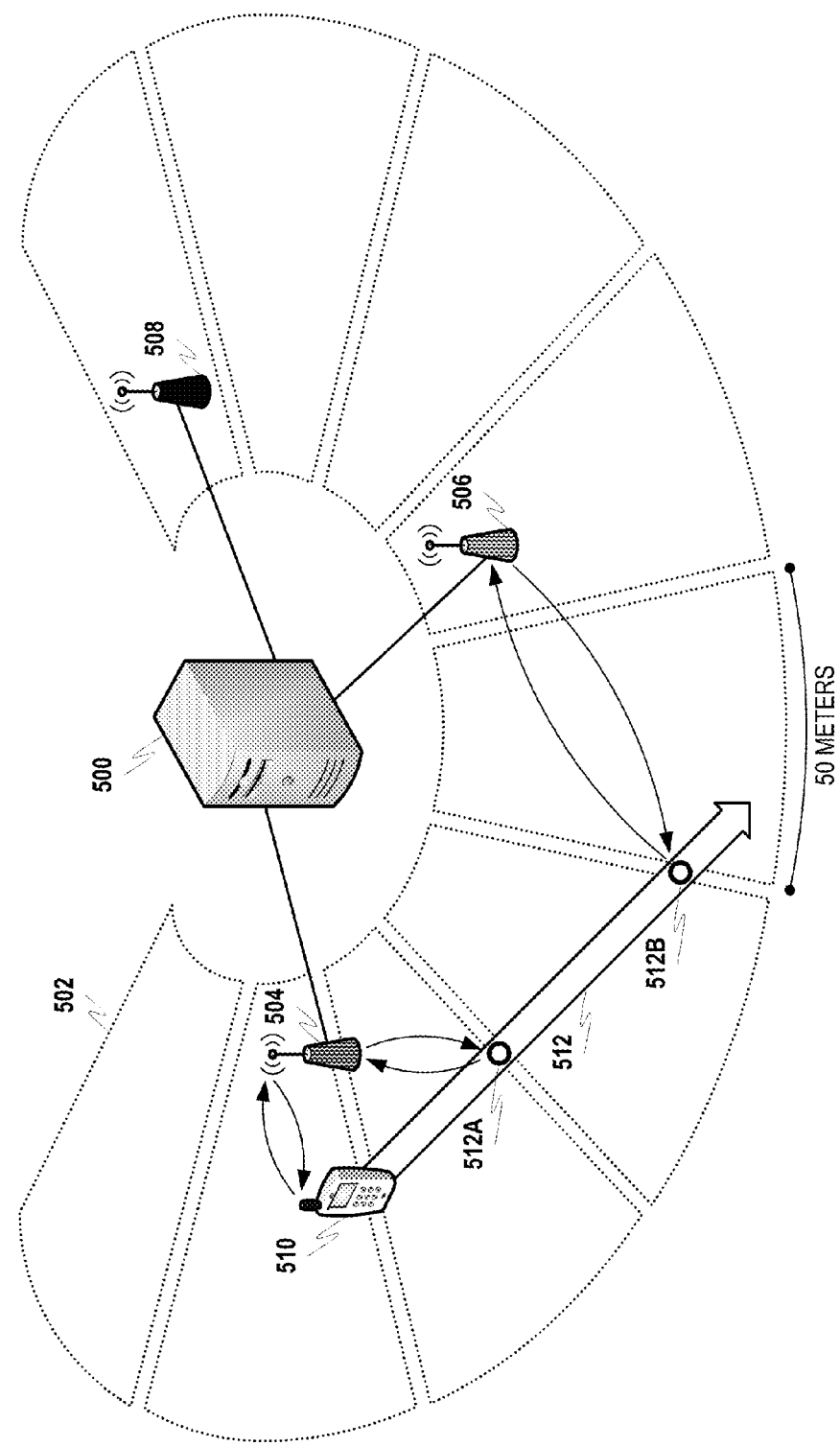
FIG. 5A discloses an example operational scenario in accordance with at least one example embodiment of the present invention.

In FIG. 5A a database 500 manages allowed channel information for a plurality of geographic areas 502. For the sake of this example each geographic area is approximately 50 meters wide in accordance with the FCC movement and reporting directives. The use of areas 502 that are 50 meters wide are simply for the sake of explanation herein, and are not meant to be limiting to the various embodiments of the present invention. Database 500 may be made up of one or more physical databases. The allowed channel information in database 500 may be provided to examples access points (AP) 504, 506 and 508 at least once per day. The allowed channel information provided to AP 504-508 may pertain specifically to the areas 502 in which their signal may be received. Further, AP 504-508 may also provide access for conveying allowed channel requests to database 500 and for providing responses to requesting apparatuses.

Apparatus 510 may be moving as indicated by path arrow 512. For example, apparatus 510 may be a mobile device being carried by a user. Apparatus 510 may communicate with AP 504 in accordance with the regulations put in place by the FCC, which may include transmitting an allowed channel request every 50 meters. This is disclosed in FIG. 5A at the initial position of apparatus 510, at position 512A and at position 512B. In each instance, AP 504 may transmit an allowed channel request including absolute (e.g., coordinates based on the Global Positioning System (GPS), cell towers, etc.) or relative (e.g., distance and/or direction from AP 504) position. Database 500 may then receive and process the request. Processing an allowed channel request may entail determining a set of allowed channels based on the reported position of the requesting apparatus and sending at least this information back to the apparatus. In terms of FIG. 5A, the interaction between apparatus 510, AP 504 and database 500 appears relatively straightforward. However, this simple scenario is greatly expanded upon in FIG. 5B.

Figure 5B:
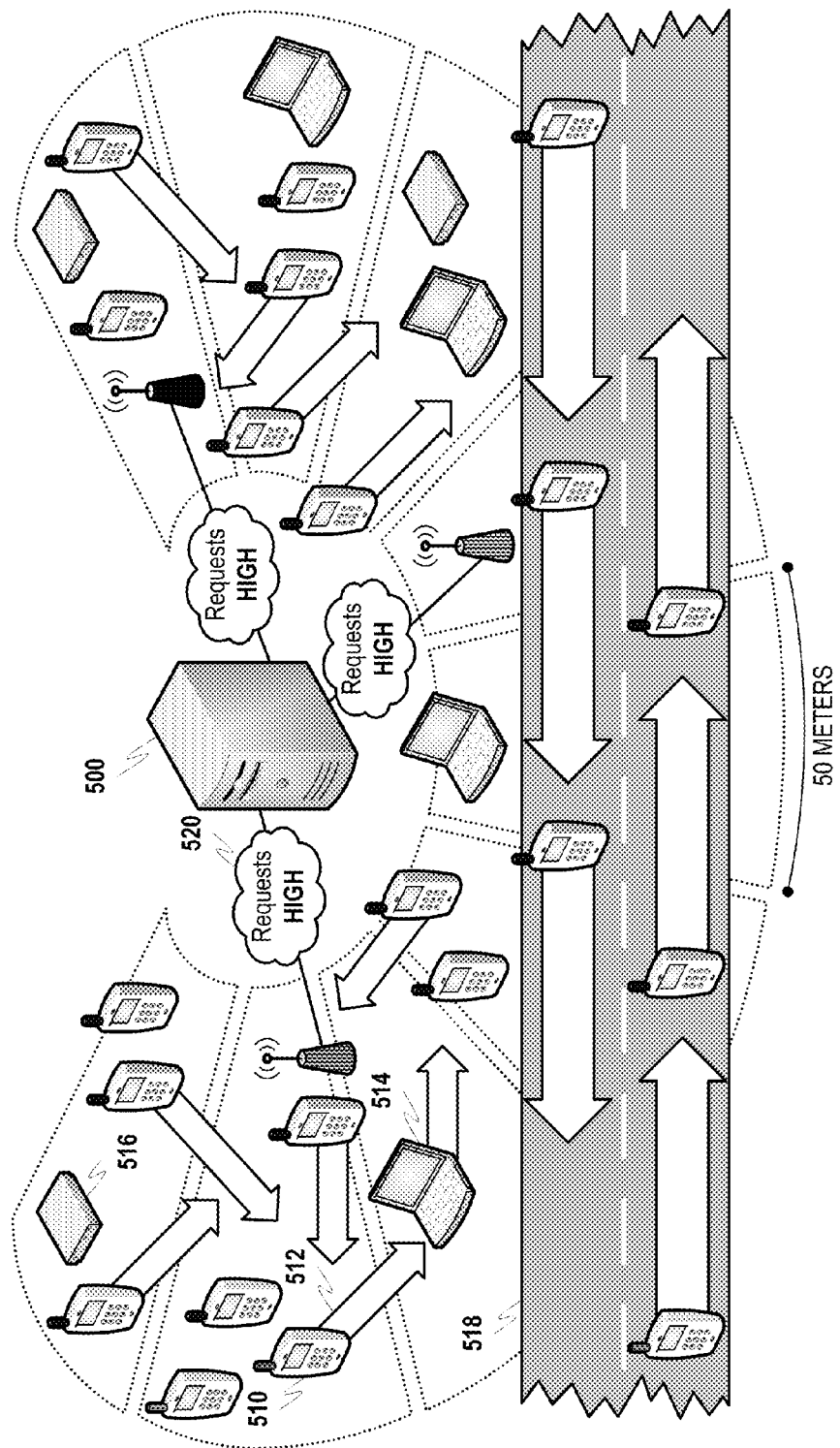
FIG. 5B discloses an example of complications that may arise in the example operational scenario of FIG. 5A.

FIG. 5B attempts to apply the demonstrative scenario of FIG. 5A to a more "real world" setting. Again apparatuses are moving within geographic areas that are each accorded a set of allowed channels. However, the scenario of FIG. 5B attempts to project these transactions, for example, into a busy metropolitan area. Apparatus 510 which may be, for example, a mobile handset is but one example of the multitude of apparatuses that may seek to operated in a TVWS system. There may also be computing-type apparatuses 514 that may move slower (or not at all) but may create more substantial wireless traffic and fixed apparatuses 516 that may not move at all but still need to request allowed channel information periodically. Presuming for the sake of explanation that all of the apparatuses disclosed in FIG. 5B will need to request allowed channel information at least when they initially enter a geographic area 502, it becomes apparent that a substantial number of requests must be received by the access points and forwarded to database 500 for processing. However, these initial allowed channel requests do not take into account the movement of the various apparatuses between the different TVWS areas 502.

The moving apparatuses in FIG. 5B are identified by movement arrows 512. The length of each movement arrow 512 delineates the starting and ending point of each apparatus, and the thickness of each movement arrow 512 represents the rate of speed. For example, apparatus 512 has a movement arrow 512 that represents the apparatus is moving at a walking pace from one area to another. Whenever apparatus 510 traverses a distance of 50 meters it may transmit an allowed channel request in accordance with current FCC guidelines. These requests may be received by access points in the certain geographic area and may be forwarded to database 500 for processing. Similarly, all of the other moving apparatuses in FIG. 5B may also be transmitting requests every 50 meters, which increases substantially the number of requests being received. To further complicate the situation. Apparatuses in moving vehicles (e.g., mobile handsets associated with users riding in moving vehicles) may be moving a distance of many meters every second as disclosed at 518. Thus, operating under the rules set forth by the FCC each device would be sending many requests per minute. This large combined processing load, as shown at 520, places a heavy burden on both requesting apparatuses and the database.

In particular, the apparatuses that desire to operate in the TVWS channels must request permission to communicate in the form of an allowed channel request. This puts a two-fold burden on apparatuses in that not only must the apparatus transmit the request and receive a response via short-range wireless communication, but apparatuses must also expend resources in constantly tracking their position. In practice this means that GPS-based positioning is required when outdoors, which may cause significant power consumption. For example, a GPS system in a mobile apparatus fixing position about once every 5 minutes will result in power consumption of about 400 mAh per day, which is about half of the battery capacity available in many mobile systems. Further, on the database side the number of location updates and requests for channel allocations the database needs to handle becomes very high. Assuming fifty million mobile white space apparatuses where on fifth of them are actually mobile at any given time would mean ten million devices are requesting allowed channel information based on their location updates from the database frequently. If all of these apparatuses travel 50 meters in an average of one minute, 16 thousand requests per second would be sent to the database. This problem is compounded by the requests coming from the fastest devices (e.g. in car) that may travel 50 meters in about two seconds. All of the requests must be processed by the database quickly so that apparatus side operation is not disrupted, which is a huge processing burden for a single database system.

IV. Example Cognitive Radio Implementation and Operation

In accordance with at least one embodiment of the present invention, architectural changes are proposed in order to alleviate the communication burden that becomes evident in a single provider allowed channel information distribution system. Alternative wireless networks may be employed to obtain this information from other sources, reducing the amount of burden that is placed on a centralized database 500. In at least one example implementation, Cognitive Radio systems may be used to form alternative wireless connections. These alternative wireless connections may handle allowed channel requests instead of direct interaction with the database.

Figure 6:
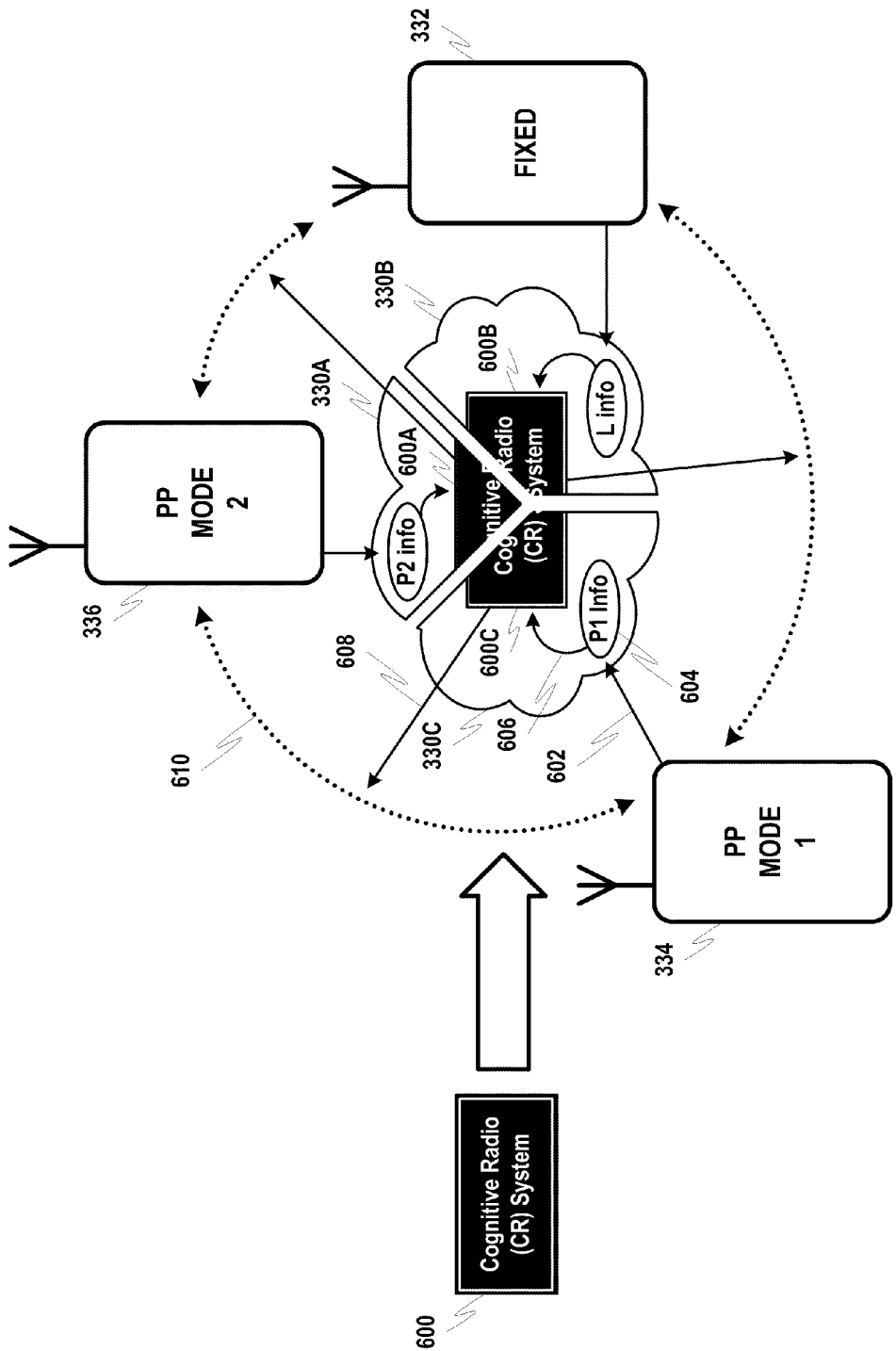
FIG. 6 discloses an example Cognitive Radio (CR) implementation in accordance with at least one embodiment of the present invention.

In accordance with at least one embodiment of the present invention, an example Cognitive Radio (CR) system 600 is disclosed in an example distributed arrangement in FIG. 6. Initially, a more general explanation of possible CR system operation will be disclosed herein, which is followed by a more specific description of how a CR system may be implemented in accordance with various embodiments of the present invention. More specifically, portions of CR 600 (e.g., 600A to C) may manage communication in operational environment sections 330A to 330C. However, the various example embodiments of the present invention are not specifically limited to the disclosed system, which has been provided for the sake of example herein. For example, CR system 600 may reside completely in a single apparatus or may be distributed amongst various apparatuses as shown at 600A to 600C. Some or all of the apparatuses 332-336 may provide information 604 to CR system 600, as shown at 606, which may use information 604 to formulate communication configuration information pertaining to some or all of apparatuses 332-336. Communication configuration information may comprise one or more preferred configurations for each apparatus (e.g., in the instance of synchronization information) or information usable by apparatuses 332-336 for formulating their own configuration. Configuration information 608 may then be made available to apparatuses 332-336 to facilitate the configuration of network communication.

Figure 7:
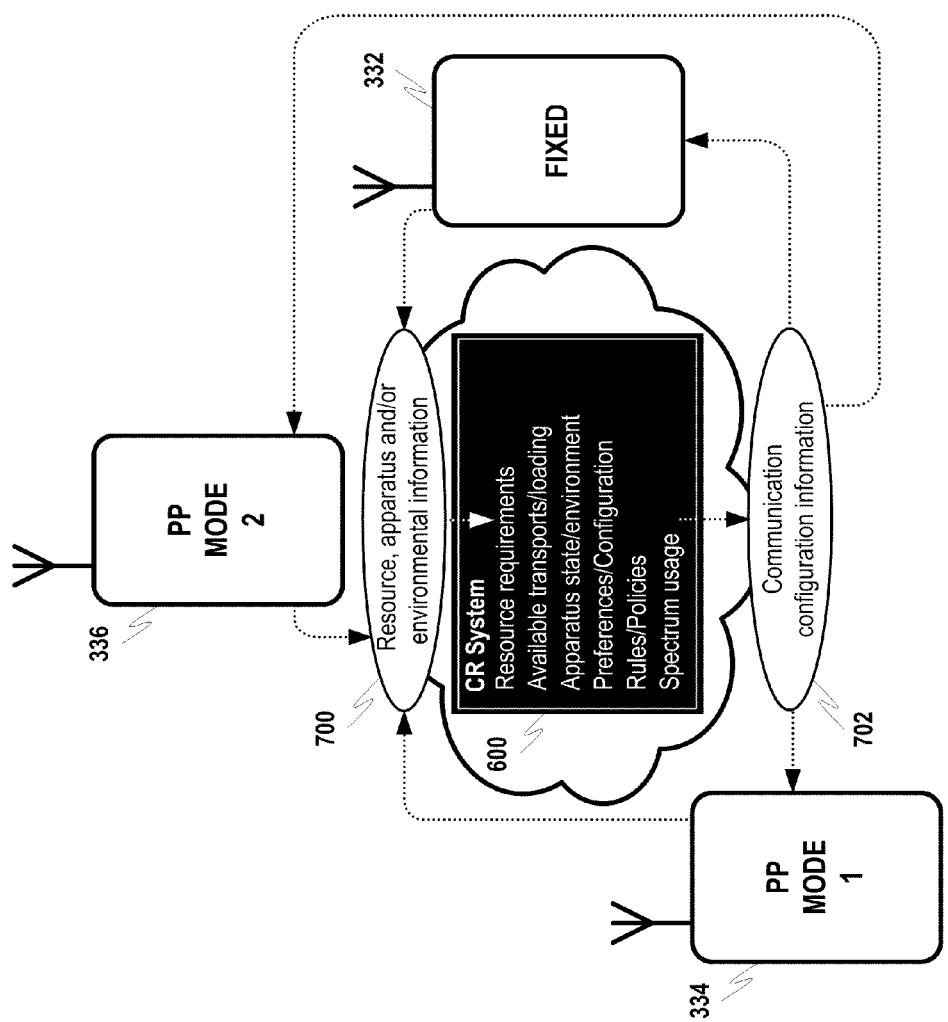
FIG. 7 discloses example criteria that may be taken into consideration when operating a Cognitive Radio (CR) system in accordance with at least one embodiment of the present invention.

FIG. 7 discloses an example methodology by which CR system 600 may formulate communication configuration information in accordance with at least one embodiment of the present invention. Initially decision criteria may be provided at 700, the decision criteria comprising resource, apparatus and/or environmental information. Examples of resource information may include, but are not limited to, applications and/or services residing on an apparatus, hardware components that may be available in an apparatus (e.g., sensors, image capture devices like cameras, etc.), data stored on apparatuses, etc. Apparatus information may comprise, for example, communication transports supported by an apparatus, apparatus security requirements and information pertaining to the current operating condition of an apparatus (e.g., power level, active transports and corresponding traffic/pending messages for each, processor loading, etc.). Environmental information may encompass data obtained by an apparatus regarding the environment in which the apparatus is operating. For example, this type of information may include the current state of the transmission spectrum local to each apparatus or the indication of potential sources of interference in these areas. Potential sources of interference may be identified based on field sensors within the apparatus, packet loss experienced in communications over particular wireless transports, etc.

The decision criteria disclosed, for example, at 700 may be supplied to CR system 600 in response to a request message, may be provided periodically based, for example, on a predetermined time period, in response to changes occurring in the apparatuses, etc. CR system 600 may utilize the received decision criteria in one or more logical determination steps as shown in FIG. 6. For example, CR system 600 may consider the decision criteria in view of resource requirements such as communication link performance requirements (e.g., high speed and/or capacity for multimedia streaming), link security requirements for accessing private and/or sensitive information, etc. CR system 600 may further consider which communication transports are available, the loading of each of these transports system-wide, and the current state and/or environmental conditions corresponding to each apparatus. For example, apparatuses that have limited power and/or processing resources may be allowed to communicate using transports that help to conserve these resources. Further, apparatuses experiencing interference based on locally active transports or proximately-located sources of interference may be limited to using transports that are immune to these types of interference. Preferences/configuration may comprise non-condition or non-environmental provisions that control transport selection. For example, users may configure WLAN over high-speed cellular transports in order to save power, certain transports may be designated as always having priority (e.g., transport carrying voice data), etc. Rules/Policies may comprise, for example, regulatory rules that the nodes need to follow in their utilization of spectrum. Spectrum usage may further be utilized to determine the frequency spectrums that are preferred (or should be avoided) when establishing new communication links. In accordance with at least one embodiment of the present invention, some or all of these criteria may be employed when implementing communication in a TVWS environment. For example, the rules in CR system 600 may protect operation for existing apparatuses by customizing the operation of TVWS apparatuses to avoid interference. Alternatively, rules in CR system 600 may protect the operation of TVWS apparatuses by modifying other apparatus operation.

The culmination of the example logical decision steps shown in FIG. 7 may take the form of communication configuration information 702. This information may be provided in various formats, such as possible communication configurations that may be adopted by an apparatus. For example, possible communication configurations may comprise assigning one or more communication transports (e.g., low power) for use in accessing a certain apparatus. Requesting applications and/or required resources may also dictate the selection of transports having specific speed, capacity, error-correction, security characteristics, etc. Further, transports may be excluded from configurations used to access certain apparatuses based on the potential negative impact of interference sources that are local or proximately-located to the apparatus.

In accordance with at least one example embodiment of the present invention, it is also possible for communication configuration information to consist of data that is usable when apparatuses are configuring their own communications. For example, communication transports supported by an apparatus, encryption or error-checking functionality available in an apparatus, local interference information and/or local spectrum utilization information, apparatus condition information, etc. may be made available to other apparatuses that desire to access resources on the apparatus. These other apparatuses may then formulate their own configuration in view of the abilities and/or limitations of the apparatus to which communication is desired. In either situation provided above (e.g., the provision of one or more possible configurations or information usable by apparatuses when configuring a link), the configuration information may be accessed directly by requesting apparatuses (e.g., such as by the apparatuses querying configuration data stored in a particular format), may be provided in one or more messages transmitted from CR system 600 in response to apparatus requests, etc.

Figure 8:
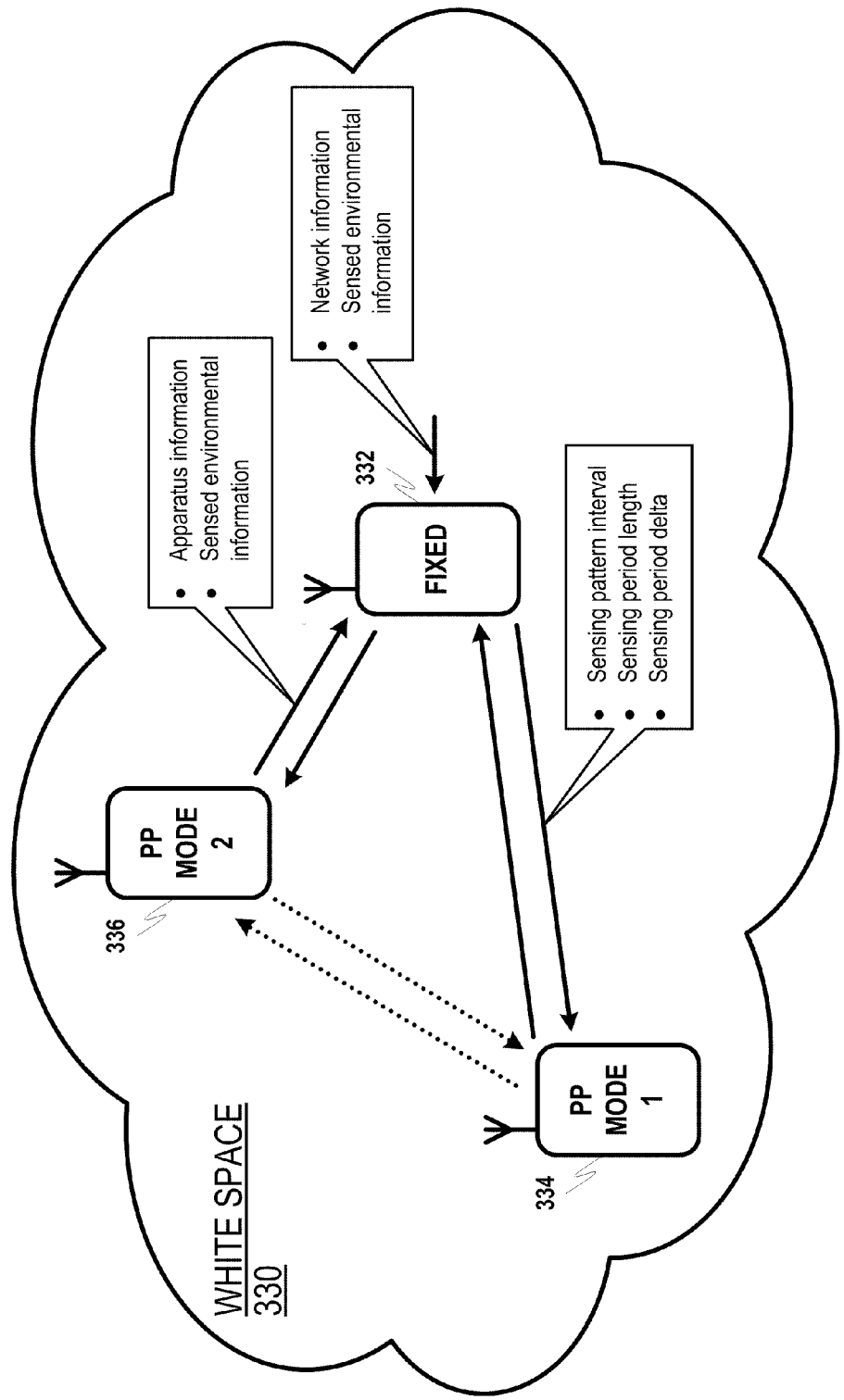
FIG. 8 discloses an example of apparatus interaction within a TVWS environment in accordance with at least one embodiment of the present invention.

FIG. 8 discloses an example of how sensing patterns may be established through the use of cognitive radio (CR) functionality. In particular, information may be transmitted from apparatuses that are operating in a particular environment (e.g., TVWS) to a CR system that uses the received information for formulating sensing pattern interval and duration information. The sensing pattern interval and duration information may be then distributed to the apparatuses for synchronizing sensing operations in the particular environment. Thus, collaborative coexistence may be established to provide awareness of apparatuses operating in the particular environment, and especially of legacy equipment activities, in order to reduce the potential for interferences.

V. Example Implementations for Reducing Allowed Channel Request Traffic

Figure 9:
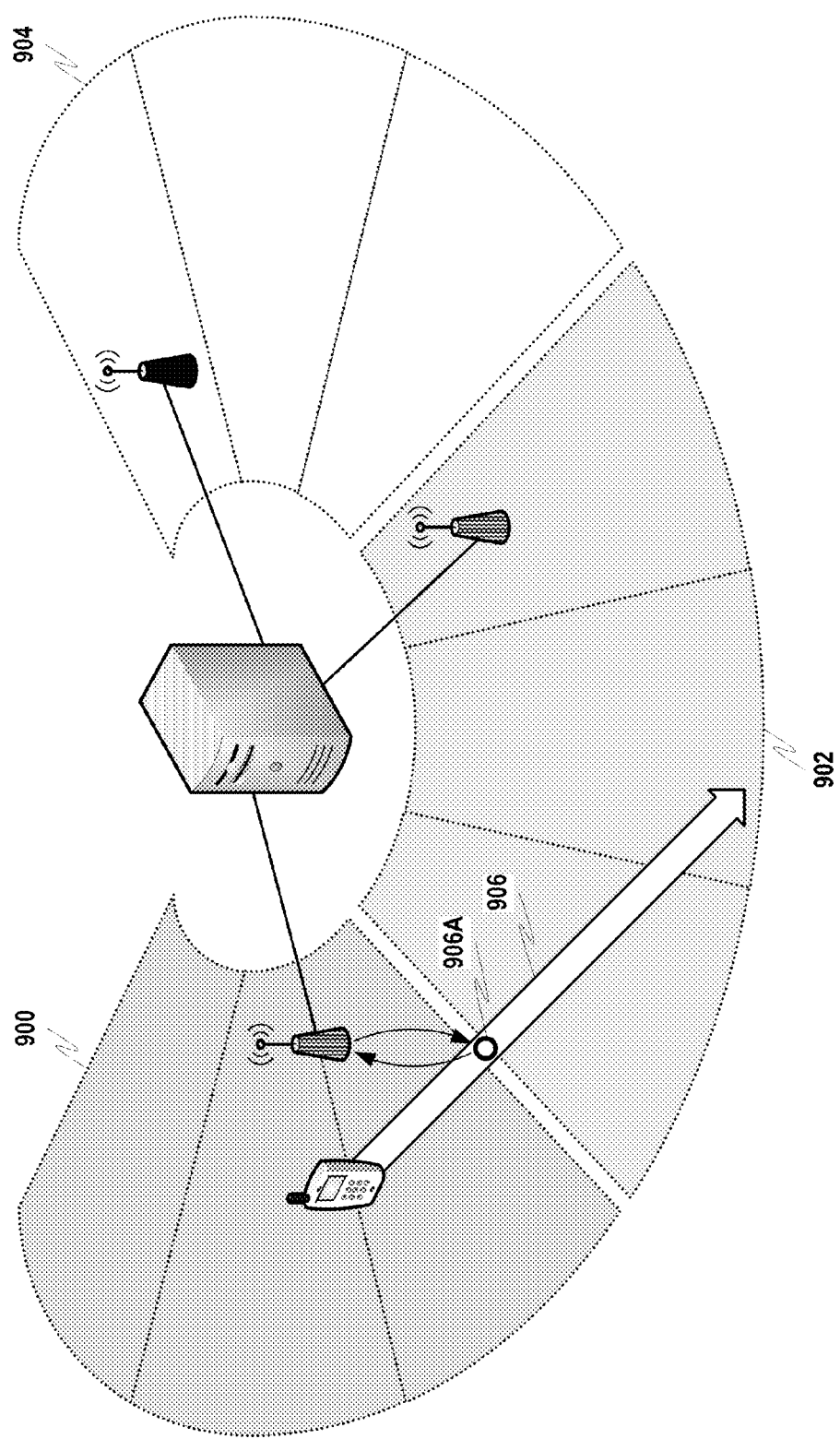
FIG. 9 discloses an example of allowed channel validity area redefinition in accordance with at least one embodiment of the present invention.
Figure 10:
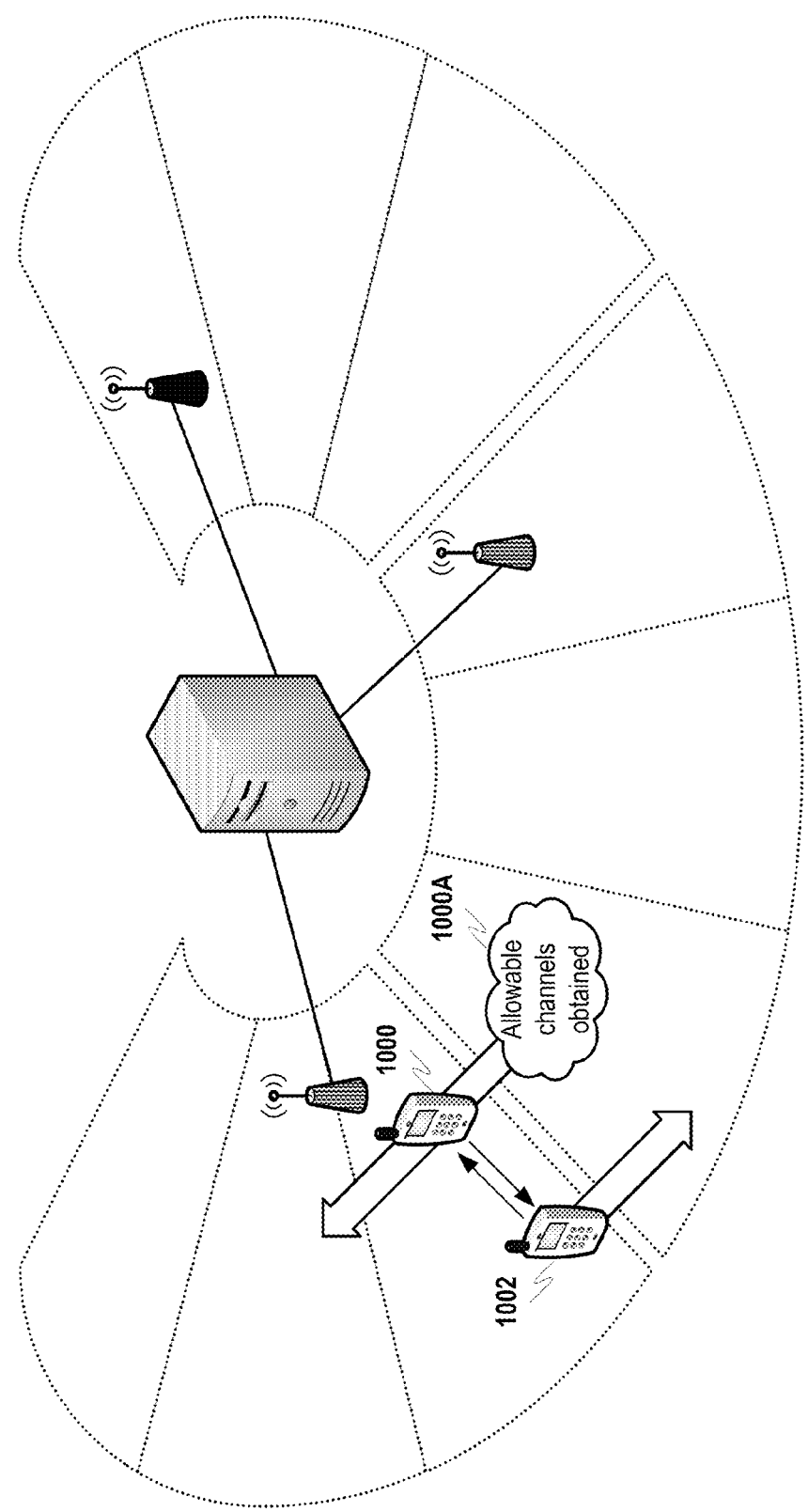
FIG. 10 discloses an example of allowed channel information conveyance in accordance with at least one embodiment of the present invention.
Figure 11:
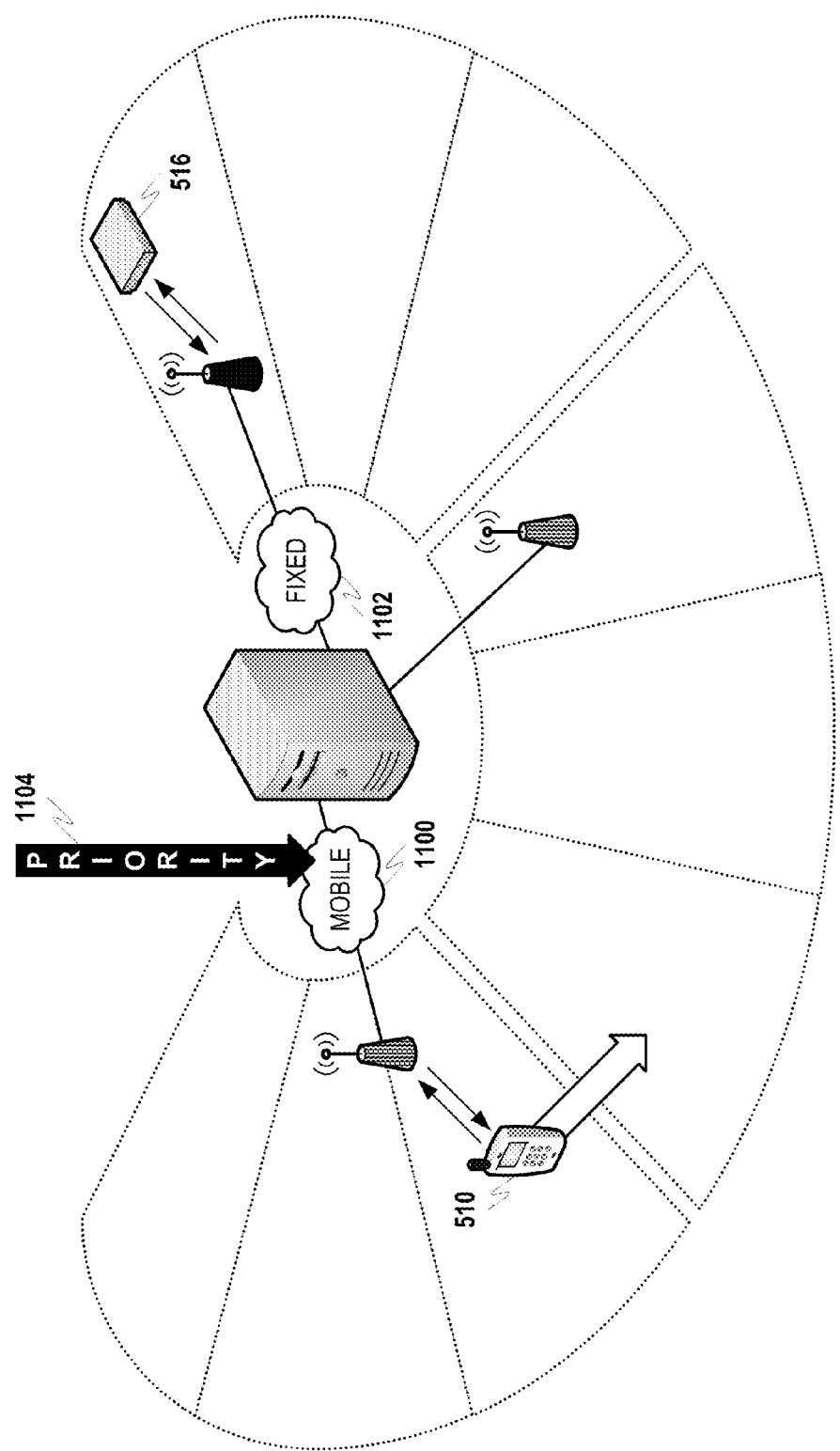
FIG. 11 discloses an example of requesting apparatus classification in accordance with at least one embodiment of the present invention.

As disclosed above in FIG. 5A-5B, current architectures and regulations for TVWS operation may be inherently burdensome in the processing load imposed on both the apparatuses requesting allowed channel information and the database tasked with processing these requests. FIG. 9-11 disclose various improvements, in accordance with at least one embodiment of the present invention, that may be implemented to alleviate these burdens.

The FCC rules currently specify that apparatuses must submit allowed channel request after traversing 50 meters. FIG. 9 introduces an alternative system wherein information regarding a certain geographic area in which the allowed channel information is deemed valid may be provided to apparatuses as part of a response to allowed channel requests. Then, the apparatuses receiving the allowed channel information may define a geographic area in which the allowed channel information is valid, and requests for allowed channel information do not have to be transmitted every 50 meters. For example, an apparatus may transmit an allowed channel request, and the response to allowed channel requests may comprise both allowed channel information and area information. The area information may describe a certain geographic area in which the allowed channel information may be considered valid. Examples of such certain geographic areas as disclosed in FIGS. 9, at 900, 902 and 904. The area information may be utilized to define the certain geographic area within an apparatus, such as by an apparatus setting the borders of the certain geographic area as places where allowed channel requests must be transmitted. The apparatus may then utilize the allowed channel information to communicate while within the certain geographic area, and positioning may be performed to ensure that the apparatus is still within the bounds of the certain geographic area.

Resource savings may be realized through the implementation of this system, in accordance with at least one embodiment of the present invention, in that fewer allowed channel requests need actually be sent to the database. Potential savings are disclosed in FIG. 9 in terms of the same example movement that was disclosed in FIG. 5A. In the previous figure at least three updates were needed (e.g., at 510, 512A and 512B) as apparatus 510 moved in accordance with path arrow 512. However, one allowed channel request is triggered at 906A in the example of FIG. 9 as the apparatus moves along path 906. This reduction occurs because the individual 50 meter areas 502 from FIG. 5A are now combined into larger certain geographic areas 900, 902 and 904, which may be tracked internally by the moving apparatus. Despite still having to track its position relative to the border of the certain geographic areas, a resource savings may occur in apparatuses since the need to communicate with the database is reduced substantially. Of course, this also decreases the amount of requests that must be handled by the database.

FIG. 10 discloses another implementation, in accordance with at least one embodiment of the present invention, that may be implemented alone or in combination with the system disclosed in FIG. 9. The burden for the database to service allowed channel requests may be reduced by servicing at least some of the requests through device interaction. Apparatuses that require allowed channel information may query other apparatuses in the area instead of going directly to the database. In at least one scenario, apparatuses may retain allowed channel information after they leave an area where the allowed channel information was valid, and may convey this information to other apparatuses that are predicted to enter the area they just left. The actual transaction may be implemented in different ways. For example, an apparatus 1000 may obtain allowed white space information 1000A in an area, and upon leaving the area it may announce that it has this information available. This announcement may be made via cognitive radio interaction such as described above. Another apparatus 1002 that is predicted to enter the area may be able to predict that it will enter the area that was previously occupied by apparatus 1000, and may request the allowed white space information from apparatus 1000. In another implementation, apparatus 1002 may request allowed channel information from apparatus 1000 using known good frequencies, such as utilizing traditional Bluetooth or WLAN operating in the 2.4 GHz range. It may also be possible for apparatus 1002 to "listen" to TVWS transmissions sent from apparatus 1000 and then to classify the channels used for transmission by apparatus 1000 as "safe" or "allowed" channels. Then, apparatus 1002 may query apparatus 1000 using the channels deemed as safe or allowed and request the allowed channel information corresponding to the area about to be entered. Regardless of the manner by which allowed channel information is obtained, time validity information such as expiration time/date may be included in allowed channel information so that receiving apparatuses may judge whether information has expired, and thus, that an allowed channel request should still be transmitted to the database.

While an interaction between two mobile devices is disclosed in FIG. 10, it is also possible that apparatuses may form alternative wireless connections with access points or other fixed apparatuses within an area, and that the allowed channel information may be requested from these fixed apparatuses. In addition to allowed channel information, area information and time validity information, the response to the allowed channel request may also comprise utilization information. This information may instruct the receiving device as to the loading on the various allowed channels so that heavily loaded channels may be avoided. Further, utilization information may also notify the receiving apparatus of legacy apparatus operation that may need to be avoided if choosing to operate on certain allowed channels. Through interactions such as the example set forth in FIG. 10 at least some of the request processing load may be shifted from the database to apparatuses actually operating in the environment, and thus, the database may be more able to respond to the requests it is handling in a timely manner.

The operation of the database may be further optimized through prioritization or received allowed channel requests. Prioritization may be done in terms in different factors. At least one parameter on which prioritization may be based in apparatus type. An example of such a prioritization scheme is disclosed in FIG. 11. In accordance with at least one embodiment of the present invention, the database may prioritize received allowed channel requests based on apparatus type information provided in the request. Mobile apparatuses (e.g., personal/portable apparatus) 510 may send allowed channel requests 1100 to the database, and the allowed channel request may comprise apparatus type information indicating that the source apparatus is a mobile apparatus. Similarly, fixed apparatus 516 may send an allowed channel request 1102 including apparatus type information to the database, the apparatus type information identifying the source apparatus as a fixed apparatus. Since mobile apparatuses are often moving, it may be deemed important to transmit responses to their requests in a timely manner so that their operation is not disrupted as they move from one area to another. Thus, allowed channel requests from mobile apparatuses may be elevated above requests from fixed devices as shown at 1104. If the response to a fixed apparatus becomes slightly delayed the impact is not as substantial is not moving, and thus, the communication configuration may not need to be altered. In a similar manner, other indications may be included in request messages, and rules within the database may determine whether these requests should be processed before other less important requests. For example, devices used by law enforcement or safety officials may be afforded high priority, while consumer entertainment apparatuses (e.g., games) may be deemed less important. Prioritization may allow the database to better manage requests by immediately servicing high priority requests. Any delay that is experienced due to high request volume may then only impact lower priority requests, which in some apparatuses (e.g., fixed) may not even be noticed.

Figure 12A:
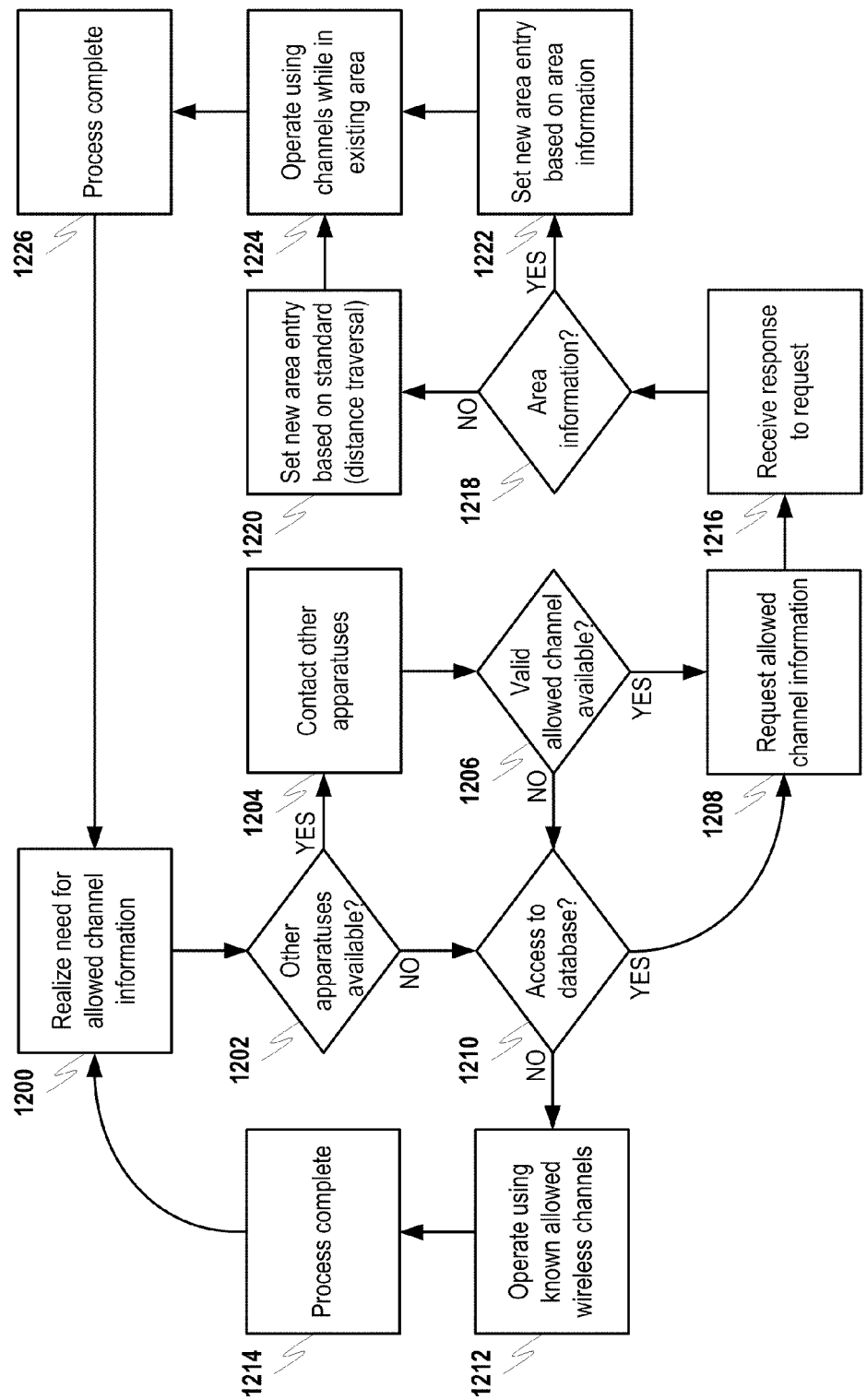
FIG. 12A discloses a flowchart for an example allowed channel information distribution process in accordance with at least one embodiment of the present invention.

A flowchart of an example process in accordance with at least one embodiment of the present invention is disclosed in FIG. 12A. More specifically, the example process of FIG. 12A is directed to apparatuses that may require allowed channel information. In step 1200 an apparatus may realize that an allowed channel information should be requested. This need may be trigged, for example, by the apparatus realizing that the allowed channel information in the apparatus is invalid. The allowed channel information in the apparatus may be deemed invalid if it does not correspond to the current location of the apparatus or another validity parameter, such as time validity information, is invalid (e.g., the allowed channel information is too old). The apparatus may then determine in step 1202 if resources are available to determine if another apparatus in the area has valid allowed channel information. If resources are available in the apparatus for querying other apparatuses, then in step 1204 an attempt may be made to contact other apparatuses. As the apparatus does not have valid allowed channel information prior to commencing the query of step 1204, this interaction may be carried out by the apparatus using a form of communication that is known to be permitted (e.g., short-range wireless communication like Bluetooth or WLAN), or by the apparatus listening for channels utilized for transmission by other apparatuses, deeming these channels to be "allowed" channels" and using these channels to contact the other apparatuses. If a connection to at least one other apparatus is established in step 1206, then allowed channel information may be requested from the other apparatus in step 1208.

If no resources are available for establishing an alternative radio connection in step 1202, then a determination may be made in step 1210 as to whether access to the central database (e.g., an access point allowing interaction with the database) is available in step 1210. If no connection is available in step 1210 then the apparatus may be limited to operation in known allowed wireless channels in step 1212. The process may then be complete in step 1214 and may return to step 1200 to await the next requirement triggering the need for allowed channel information. Otherwise, if a connection to the central database is available in step 1210, then in step 1208 allowed channel information may be requested from the database.

Regardless of how the allowed channel information is requested (e.g., either from an alternative wireless connection or directly from the database), the process may then proceed to step 1216 where a response is received. The apparatus may then determine in step 1218 if, in addition to the allowed channel information, the response also comprises area information. If the response does not include area information, then a trigger for requesting new allowed channel information (e.g., entering a new area) may be set based on standard operation. For example, a request for allowed channel information may be triggered after the apparatus traverses a certain distance. Otherwise, in step 1224 area information contained in the response may be utilized by the apparatus to set a trigger for requesting new allowed channel information (e.g., entering a new area) based on the area information. The area information may, for example, provide coordinates that allow the apparatus to mark the borders of an area, and crossing any of these borders may cause the apparatus to request new allowed channel information. The process may then move from either step 1220 or step 1222 to step 1224 where the apparatus may operate using the allowed channel information while in the existing area (e.g., the area associated with the allowed channel information). The process may then be complete in step 1222 and may return to step 1200 in preparation for the next need to request allowed channel information.

Figure 12B:
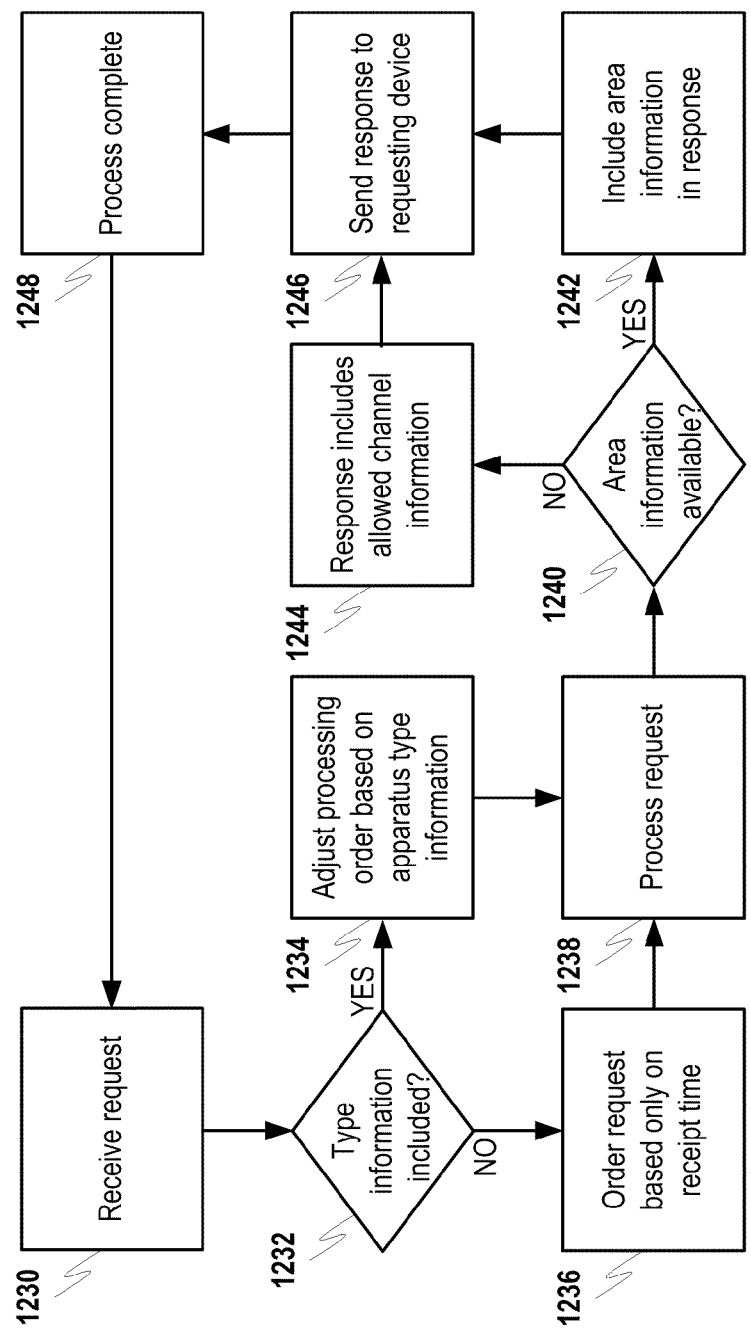
FIG. 12B discloses a flowchart for another example allowed channel information distribution process in accordance with at least one embodiment of the present invention.

A flowchart of another example process in accordance with at least one embodiment of the present invention is disclosed in FIG. 12B. In particular, the example process of FIG. 12B is directed to a database for handling allowed channel information requests. In step 1230 a allowed channel information request may be received. In step 1232 a determination may be made as to whether apparatus type information is included in the request. If apparatus type information is included in the request, then the processing of the request may be adjusted based on the apparatus type information in step 1234. Various processing adjustment strategies may be employed. For example, allowed channel requests that are determined to comprise apparatus type information may be processed before or after allowed channel requests that are determined not to comprise apparatus type information. Further, one apparatus type may be prioritized above another apparatus type. This may include prioritizing allowed channel requests received from apparatuses identified as mobile type apparatuses above allowed channel requests received from fixed apparatuses. Otherwise, if no type information is included in the request, the apparatus may order the request for processing based only on when the request was received.

The request may then be processed in step 1238. For example, processing may include channel information corresponding to location information provided in the request being compiled into a response. A further inquiry may be made in step 1240 as to whether area information corresponding to the allowed channel information is available. Area information may, for example, describe aspects of a geographic area (e.g., boundaries) in which the allowed channel information is valid. If modified area information is available it may be included in the response in step 1242. Otherwise, the response may comprise only allowed channel information in step 1244. The process may then process from either step 1242 or step 1242 to step 1246 where the response message is sent back to the requesting device. The process may then be complete in step 1248 and may return to step 1230 in preparation for the receipt of further allowed channel information requests.

Figure 12C:
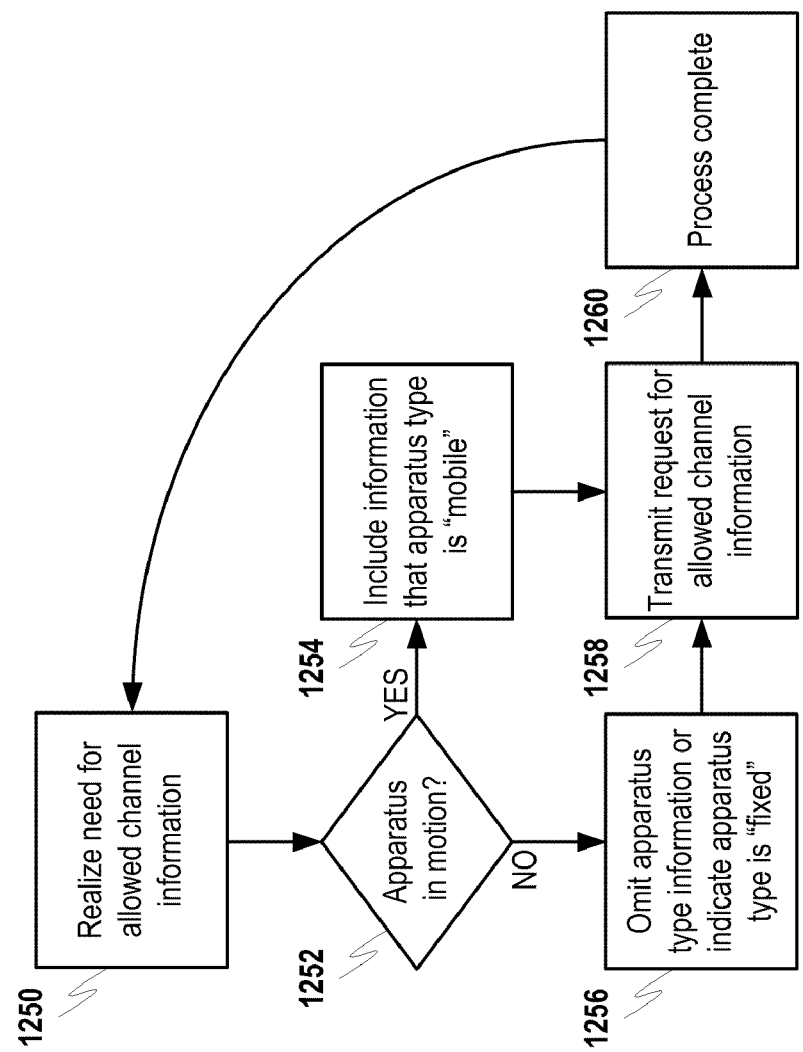
FIG. 12C discloses a flowchart for a third example allowed channel information distribution process in accordance with at least one embodiment of the present invention.

A flowchart of another example process in accordance with at least one embodiment of the present invention is disclosed in FIG. 12C. In particular, the example process of FIG. 12C is directed to the transmission of requests for allowed channel information. In step 1250 an apparatus may realize the need to request allowed channel information. This need may be realized in the same manner explained with respect to step 1200 in FIG. 12A. Once the need to request allowed channel information is realized in step 1250, a determination may then be made in step 1252 as to whether or not the apparatus is in motion. This determination may be made, for example, based on a change in position determined in view of the position tracking required by the FCC for allow TVWS apparatuses. If in step 1252 the apparatus is determined to be moving, then in step 1254 the apparatus may include apparatus type information in the request for allowed channel information. For example, the apparatus type information may identify the apparatus as a "mobile" apparatus. Otherwise, the process may move to step 1256 where the request for allowed channel information may omit apparatus type information or may indicate that the apparatus is a "fixed" apparatus. Regardless of whether step 1254 or 1256 is executed, the process may then proceed to step 1258 where the request for allowed channel information is transmitted. The process may then terminate in step 1260 and return to step 1250 in preparation for the next realization that allowed channel information is needed.

Figure 12D:
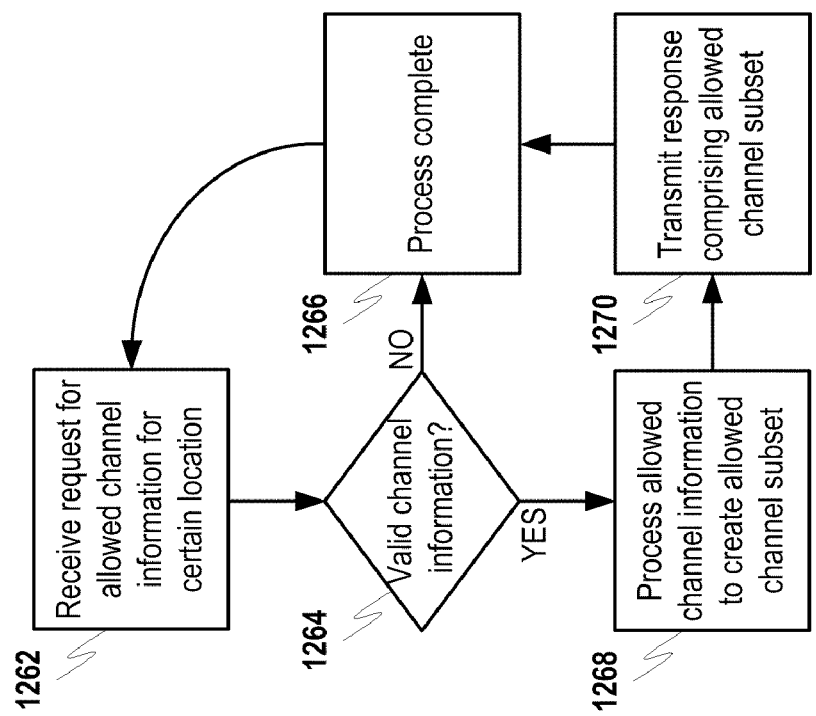
FIG. 12D discloses a flowchart for a fourth example allowed channel information distribution process in accordance with at least one embodiment of the present invention.

A flowchart of another example process in accordance with at least one embodiment of the present invention is disclosed in FIG. 12D. In some instances apparatuses may receive requests for allowed channel information from other apparatuses. In step 1262 an apparatus may receive such a request pertaining to a certain location. For example, an apparatus leaving a location may receive an allowed channel request from another apparatus about to enter the location. In step 1264 the apparatus that received the allowed channel request for the certain location may determine whether it contains valid allowed channel information pertaining to the certain location. In some circumstances apparatuses may retain allowed channel information for a certain location, but the information is invalid (e.g., due to an expired time validity constraint).

If in step 1264 the receiving apparatus determines that it does not contain valid allowed channel information for the certain location (e.g., the information is missing or invalid), the process may terminate in step 1266 and return to step 1262 in preparation for the next request for allowed channel information. Otherwise, in step 1268 the valid allowed channel information may be processed in order to create a subset of the allowed channel information, the subset including some or all of channels indicated in the database as being allowed for the certain area. For example, the apparatus that received the request for allowed channel information may have monitored channel usage in the particular location, and may select allowed channels that were not in use (e.g., to avoid interference), were observed to have less traffic, etc., to be in the subset. Further, allowed channels contained in the subset may be listed in a preferred order of use based on apparatus experience when in the particular location. For example, better signal quality may have been observed when using certain allowed channels that may be listed earlier in the subset.

In accordance with at least one embodiment of the present invention, a response may to the request for allowed channel information may be formulated in the apparatus in step 1270. The response may include at least the subset of allowed channel information, but may also include other information. For example, responses may also comprise all allowed channels that were originally identified for the particular location by the database, may include channel usage monitored by the apparatus when operating in the particular location, etc. Such information may allow apparatuses that receive these responses to formulate their own list of preferred allowed channels based on all allowed channels that were indicated as available by the database. After a response to the allowed channel request is transmitted the process may be complete in step 1266 and may return to step 1262 in preparation for the next request for allowed channel information.

While various exemplary configurations of the present invention have been disclosed above, the present invention is not strictly limited to the previous embodiments.

For example, an embodiment the present invention may include, in accordance with at least one example embodiment, an apparatus comprising means for initiating wireless communication activity in an apparatus desiring to operate in reallocated unlicensed bandwidth by determining whether allowed channel information corresponding to the current location of the apparatus exists in the apparatus and is valid, means for, if it is determined that the allowed channel information does not exist in the apparatus or is invalid, determining if at least one other apparatus can provide the allowed channel information to the apparatus, means for, if it is determined that at least one other apparatus can provide the allowed channel information to the apparatus, requesting the allowed channel information from the at least one other apparatus, and means for if it is determined that no other apparatuses can provide the allowed channel information to the apparatus, requesting the allowed channel information from a database.

In another example, an embodiment of the present invention may include, in accordance with at least one example embodiment, an apparatus comprising means for receiving a request for allowed channel information at a database, means for determining if the request comprises apparatus type information, means for processing the request to create a response, wherein the request is processed in a different manner if the request was determined to comprise apparatus type information than if the request was determined not to comprise apparatus type information, and means for transmitting the response comprising at least allowed channel information.

In another example, an embodiment of the present invention may include, in accordance with at least one example embodiment, an apparatus comprising means for initiating wireless communication activity in an apparatus desiring to operate in reallocated unlicensed bandwidth by determining whether allowed channel information corresponding to the current location of the apparatus exists in the apparatus and is valid, and if it is determined that the allowed channel information does not exist in the apparatus or is invalid, means for determining whether the apparatus is moving, and if the apparatus is determined to be moving, transmitting a request for allowed channel information comprising information indicating that the apparatus is a mobile type apparatus.

In another example, an embodiment of the present invention may include, in accordance with at least one example embodiment, an apparatus comprising means for receiving a request for allowed channel information corresponding to a certain location at an apparatus, means for determining if valid allowed channel information corresponding to the certain location exists in the apparatus, means for, if valid allowed channel information corresponding to the certain location exists in the apparatus, processing the valid allowed channel information to create at least a subset of the valid allowed channel information, and means for transmitting a response to the request for allowed channel information, the response comprising at least the subset of the valid allowed channel information.

At least one other example embodiment of the present invention may include electronic signals that cause apparatuses to initiate wireless communication activity in an apparatus desiring to operate in reallocated unlicensed bandwidth by determining whether allowed channel information corresponding to the current location of the apparatus exists in the apparatus and is valid, if it is determined that the allowed channel information does not exist in the apparatus or is invalid, determine if at least one other apparatus can provide the allowed channel information to the apparatus, if it is determined that at least one other apparatus can provide the allowed channel information to the apparatus, request the allowed channel information from the at least one other apparatus, and if it is determined that no other apparatuses can provide the allowed channel information to the apparatus, request the allowed channel information from a database.

In another example, an embodiment of the present invention may include electronic signals that cause apparatuses to receive a request for allowed channel information at a database, determine if the request comprises apparatus type information, process the request to create a response, wherein the request is processed in a different manner if the request was determined to comprise apparatus type information than if the request was determined not to comprise apparatus type information, and transmit the response comprising at least allowed channel information.

In another example, an embodiment of the present invention may include electronic signals that cause apparatuses to initiate wireless communication activity in an apparatus desiring to operate in reallocated unlicensed bandwidth by determining whether allowed channel information corresponding to the current location of the apparatus exists in the apparatus and is valid, and if it is determined that the allowed channel information does not exist in the apparatus or is invalid, determine whether the apparatus is moving, and if the apparatus is determined to be moving, transmitting a request for allowed channel information comprising information indicating that the apparatus is a mobile type apparatus.

In another example, an embodiment of the present invention may include electronic signals that cause apparatuses to receive a request for allowed channel information corresponding to a certain location at an apparatus, determine if valid allowed channel information corresponding to the certain location exists in the apparatus, if valid allowed channel information corresponding to the certain location exists in the apparatus, process the valid allowed channel information to create at least a subset of the valid allowed channel information, and transmit a response to the request for allowed channel information, the response comprising at least the subset of the valid allowed channel information.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    initiating wireless communication activity in an apparatus by determining whether allowed channel information corresponding to the current location of the apparatus exists in the apparatus and is valid;
    if it is determined that the allowed channel information does not exist in the apparatus or is invalid, determining if at least one other apparatus can provide the allowed channel information to the apparatus;
    if it is determined that at least one other apparatus can provide the allowed channel information to the apparatus, requesting the allowed channel information from the at least one other apparatus; and
    if it is determined that no other apparatuses can provide the allowed channel information to the apparatus, requesting the allowed channel information from a database.

2. The method of claim 1, wherein the validity of the allowed channel information is determined based on at least one of geographic area information and time validity information in the allowed channel information.

3. The method of claim 1, wherein determining if at least one other apparatus can provide the allowed channel information comprises determining if the at least one other apparatus contains valid allowed channel information corresponding to the current location by interacting with the at least one other apparatus via short-range wireless communication.

4. A method, comprising:
    receiving a request for allowed channel information at a database;
    determining if the request comprises apparatus type information;
    processing the request to create a response, wherein the request is processed in a different manner if the request was determined to comprise apparatus type information than if the request was determined not to comprise apparatus type information; and
    transmitting the response comprising at least allowed channel information.

5. The method of claim 4, wherein apparatus type information identifies an apparatus that transmitted the request as a mobile apparatus or a fixed apparatus.

6. The method of claim 5, wherein processing the request to create the response comprises prioritizing requests comprising apparatus type information that identifies the apparatus that transmitted the request as a mobile apparatus over requests comprising apparatus type information that identifies the apparatus that transmitted the request as a fixed apparatus.

7. The method of claim 4, wherein the response further comprises at least one of time validity information and information that identifies a geographic area in which the allowed channel information is valid.

8. A method, comprising:
    initiating wireless communication activity in an apparatus by determining whether allowed channel information corresponding to the current location of the apparatus exists in the apparatus and is valid; and
    if it is determined that the allowed channel information does not exist in the apparatus or is invalid, determining whether the apparatus is moving, and if the apparatus is determined to be moving, transmitting a request for allowed channel information comprising information indicating that the apparatus is a mobile type apparatus.

9. A method, comprising:
    receiving a request for allowed channel information corresponding to a certain location at an apparatus;
    determining if valid allowed channel information corresponding to the certain location exists in the apparatus;
    if valid allowed channel information corresponding to the certain location exists in the apparatus, processing the valid allowed channel information to create at least a subset of the valid allowed channel information; and
    transmitting a response to the request for allowed channel information, the response comprising at least the subset of the valid allowed channel information.

10. The method of claim 9, wherein the subset of the allowed channel information comprises allowed channels that are not being utilized by other apparatuses operating in the certain location.

11. The method of claim 9, wherein the subset of the allowed channel information comprises allowed channels listed in a preferred order of use based on allowed channels that were used by the apparatus.

12. A computer program product, comprising computer executable program code recorded on a non-transitory computer readable storage medium, the executable program code comprising:
    code configured to cause an apparatus to initiate wireless communication activity by determining whether allowed channel information corresponding to the current location of the apparatus exists in the apparatus and is valid;
    code configured to cause the apparatus to, if it is determined that the allowed channel information does not exist in the apparatus or is invalid, determine if at least one other apparatus can provide the allowed channel information to the apparatus;
    code configured to cause the apparatus to, if it is determined that at least one other apparatus can provide the allowed channel information to the apparatus, request the allowed channel information from the at least one other apparatus; and
    code configured to cause the apparatus to, if it is determined that no other apparatuses can provide the allowed channel information to the apparatus, request the allowed channel information from a database.

13. The computer program product of claim 12, wherein the code configured to cause the apparatus to determine if at least one other apparatus can provide the allowed channel information further comprises code configured to cause the apparatus to determine if the at least one other apparatus contains valid allowed channel information corresponding to the current location by interacting with the at least one other apparatus via short-range wireless communication.

14. A computer program product, comprising computer executable program code recorded on a non-transitory computer readable storage medium, the executable program code comprising:
    code configured to cause an apparatus to receive a request for allowed channel information in a database;
    code configured to cause the apparatus to determine if the request comprises apparatus type information;
    code configured to cause the apparatus to process the request to create a response, wherein the request is processed in a different manner if the request was determined to comprise apparatus type information than if the request was determined not to comprise apparatus type information; and code configured to cause the apparatus to transmit the response comprising at least allowed channel information.

15. The computer program product of claim 14, wherein apparatus type information identifies an apparatus that transmitted the request as a mobile apparatus or a fixed apparatus.

16. The computer program product of claim 15, wherein the code configured to cause the apparatus to process the request to create the response further comprises code configured to cause the apparatus to prioritize requests comprising apparatus type information that identifies the apparatus that transmitted the request as a mobile apparatus over requests comprising apparatus type information that identifies the apparatus that transmitted the request as a fixed apparatus.

17. A computer program product, comprising computer executable program code recorded on a non-transitory computer readable storage medium, the executable program code comprising:
 code configured to cause an apparatus to initiate wireless communication activity in an apparatus by determining whether allowed channel information corresponding to the current location of the apparatus exists in the apparatus and is valid; and
 code configured to cause the apparatus to, if it is determined that the allowed channel information does not exist in the apparatus or is invalid, determine whether the apparatus is moving, and if the apparatus is determined to be moving, transmit a request for allowed channel information comprising information indicating that the apparatus is a mobile type apparatus.

18. A computer program product, comprising computer executable program code recorded on a non-transitory computer readable storage medium, the executable program code comprising:
 code configured to cause an apparatus to receive a request for allowed channel information corresponding to a certain location;
 code configured to cause the apparatus to determine if valid allowed channel information corresponding to the certain location exists in the apparatus;
 code configured to cause the apparatus to, if valid allowed channel information corresponding to the certain location exists in the apparatus, process the valid allowed channel information to create at least a subset of the valid allowed channel information; and
 code configured to cause the apparatus to transmit a response to the request for allowed channel information, the response comprising at least the subset of the valid allowed channel information.

19. An apparatus, comprising:
 at least one processor; and
 at least one memory including executable instructions, the at least one memory and the executable instructions being configured to, in cooperation with the at least one processor, cause the apparatus to perform at least the following:
  initiate wireless communication activity by determining whether allowed channel information corresponding to the current location of the apparatus exists in the apparatus and is valid;
  if it is determined that the allowed channel information does not exist in the apparatus or is invalid, determine if at least one other apparatus can provide the allowed channel information to the apparatus;
  if it is determined that at least one other apparatus can provide the allowed channel information to the apparatus, request the allowed channel information from the at least one other apparatus; and
  if it is determined that no other apparatuses can provide the allowed channel information to the apparatus, request the allowed channel information from a database.

20. The apparatus of claim 19, wherein the validity of the allowed channel information is determined based on at least one of geographic area information and time validity information in the allowed channel information.

21. The apparatus of claim 19, wherein the at least one memory and the executable instructions being configured to, in cooperation with the at least one processor, cause the apparatus to determine if at least one other apparatus can provide the allowed channel information comprises the at least one memory and the executable instructions being further configured to, in cooperation with the at least one processor, cause the apparatus to determine if the at least one other apparatus contains valid allowed channel information corresponding to the current location by interacting with the at least one other apparatus via short-range wireless communication.

22. An apparatus, comprising:
 at least one processor; and
 at least one memory including executable instructions, the at least one memory and the executable instructions being configured to, in cooperation with the at least one processor, cause the apparatus to perform at least the following:
  receive a request for allowed channel information at a database;
  determine if the request comprises apparatus type information;
  process the request to create a response, wherein the request is processed in a different manner if the request was determined to comprise apparatus type information than if the request was determined not to comprise apparatus type information; and
  transmit the response comprising at least allowed channel information.

23. The apparatus of claim 22, wherein apparatus type information identifies an apparatus that transmitted the request as a mobile apparatus or a fixed apparatus.

24. The apparatus of claim 23, wherein the at least one memory and the executable instructions are further configured to, in cooperation with the at least one processor, cause the apparatus to prioritize requests comprising apparatus type information that identifies the apparatus that transmitted the request as a mobile apparatus over requests comprising apparatus type information that identifies the apparatus that transmitted the request as a fixed apparatus.

25. The apparatus of claim 22, wherein the response further comprises at least one of time validity information and information that identifies a geographic area in which the allowed channel information is valid.

26. An apparatus, comprising:
 at least one processor; and
 at least one memory including executable instructions, the at least one memory and the executable instructions being configured to, in cooperation with the at least one processor, cause the apparatus to perform at least the following:
  initiate wireless communication activity by determining whether allowed channel information corresponding to the current location of the apparatus exists in the apparatus and is valid; and if it is determined that the allowed channel information does not exist in the apparatus or is invalid, determine whether the apparatus is moving, and if the apparatus is determined to be moving, transmit a request for allowed channel information comprising information indicating that the apparatus is a mobile type apparatus.

27. An apparatus, comprising:

at least one processor; and at least one memory including executable instructions, the at least one memory and the executable instructions being configured to, in cooperation with the at least one processor, cause the apparatus to perform at least the following:

receive a request for allowed channel information corresponding to a certain location at an apparatus;

determine if valid allowed channel information corresponding to the certain location exists in the apparatus;

if valid allowed channel information corresponding to the certain location exists in the apparatus, process the valid allowed channel information to create at least a subset of the valid allowed channel information; and transmit a response to the request for allowed channel information, the response comprising at least the subset of the valid allowed channel information.

28. The apparatus of claim 27, wherein the subset of the allowed channel information comprises allowed channels that are not being utilized by other apparatuses operating in the certain location.

29. The apparatus of claim 27, wherein the subset of the allowed channel information comprises allowed channels listed in a preferred order of use based on allowed channels that were used by the apparatus.

* * * * *